US012505250B1

(12) United States Patent
Tran

(10) Patent No.: US 12,505,250 B1
(45) Date of Patent: Dec. 23, 2025

(54) PERSONAL ASSISTANT WITH SECURE LLM

(71) Applicant: Bao Tran, Saratoga, CA (US)

(72) Inventor: Bao Tran, Saratoga, CA (US)

(*) Notice: Subject to any disclaimer, the term of this patent is extended or adjusted under 35 U.S.C. 154(b) by 74 days.

(21) Appl. No.: 18/753,900

(22) Filed: Jun. 25, 2024

(51) Int. Cl.
G06F 21/62 (2013.01)
A61B 5/00 (2006.01)

(52) U.S. Cl.
CPC ........ G06F 21/6245 (2013.01); A61B 5/4884 (2013.01)

(58) Field of Classification Search
CPC ................ G06F 21/6245; A61B 5/4884
See application file for complete search history.

(56) References Cited

U.S. PATENT DOCUMENTS

2024/0419830 A1* 12/2024 Park ............... G06F 21/6254
2025/0315617 A1* 10/2025 Boué .............. G06F 16/33295
2025/0322963 A1* 10/2025 Solomon .......... G16H 70/60

* cited by examiner

Primary Examiner — Frantz B Jean
(74) Attorney, Agent, or Firm — PatentPC; Bao Tran

(57) ABSTRACT

A method for using a local large language model (LLM) within a user's secure computing environment is disclosed. The LLM operates behind a firewall to prevent transmission of sensitive data, and utilizes an encrypted vector database and artificial intelligence techniques for content retrieval, response generation, and task anticipation. This system can be used on mobile, wearable, vehicle, or IoT devices and offers various services such as health monitoring, financial advice, automated communications handling, and personalized daily activity optimization. It also has the ability to detect fraud, fine-tune responses using augmented user data, assist in negotiations, identify personal interests, and provide health recommendations based on dietary and physical activity data.

20 Claims, 20 Drawing Sheets

PERSONAL ASSISTANT WITH SECURE LLM

BACKGROUND OF THE INVENTION

The present invention relates to private large language models (LLMs).

In recent years, advances in artificial intelligence (AI), particularly in the field of natural language processing (NLP) and machine learning (ML), have led to the development of sophisticated language models that can understand, generate, and manipulate human language with remarkable fluency. Large language models (LLMs) like OpenAI's GPT series have demonstrated the ability to perform a wide range of language-related tasks, such as language translation, question answering, and content summarization. However, the pervasive dependence on cloud computing environments and external servers to process and store personal data raises significant privacy and security concerns. Users are becoming particularly wary of their sensitive information being harvested and analyzed in such environments, particularly in light of frequent data breaches and unauthorized uses of personal information.

SUMMARY OF THE INVENTION

In one aspect, a method for providing secure, privacy-focused, and personalized chat and task management assistance through the use of a local large language model (LLM) within a user's secure computing environment. The method involves restricting the LLM's operation behind a firewall to ensure no sensitive data is transmitted/sent outside of the local environment, utilizing an encrypted vector database for content retrieval and response generation, and applying artificial intelligence techniques to user data for task anticipation and action.

In another aspect, a method for chatting in a secured computing environment includes providing a local large language model (LLM) secured by a firewall that restricts the LLM to data within the secured computing environment without sending information to the Internet; specifying predetermined content and applying an encrypted vector database to the predetermined content for retrieval-augmented generation (RAG); collecting user data from sensors and applications and storing the collected user data in an encrypted vector database on the device; analyzing the stored user data using the local LLM to anticipate user tasks; and applying RAG with the local LLM to generate a personalized response and to perform actions on behalf of the user, wherein the local LLM maintains user privacy by processing data locally in the secured environment without transmitting private or confidential information to a processor outside of the secured computing environment.

The collecting user data can include collecting one or more of location data, health data, messaging data, email data, calendar data, and financial data and wherein performing actions comprises one or more of: sending messages, scheduling appointments, and adjusting device settings. The generating personalized recommendations can include applying cognitive behavioral therapy (CBT) techniques to the analyzed user data; generating recommendations to improve the user's productivity, health, or finances. The device can perform receiving health sensor data, including heart rate data, blood pressure data; analyzing the stored health sensor data using a local large language model (LLM) on the mobile device to identify patterns indicative of user medical conditions, including hypertension, diabetes, or anxiety; detecting the user medical condition based on the analysis of the health sensor data; generating personalized CBT exercises based on the detected medical condition using the local LLM; presenting the personalized CBT exercises to the user via a mobile device application; tracking user adherence to the applied CBT treatment and adjusting the CBT treatment based on the tracked adherence using the local LLM; detecting improvements in the user's medical condition based on subsequent health sensor data and modifying the applied CBT treatment based on the detected improvements using the local LLM; identifying behavioral excesses and deficits related to the detected medical condition using the local LLM and generating interventions targeted at modifying the identified behavioral excesses and deficits; assessing the user's coping behaviors related to the detected medical condition using the local LLM and incorporating coping skill development into the applied CBT treatment; evaluating impairments in the user's functioning due to the detected medical condition using the local LLM and prioritizing treatment of impairments associated with higher risk; conducting an ongoing functional analysis using the local LLM to identify antecedents and consequences maintaining problematic behaviors related to the medical condition; and periodically reassessing the user's medical condition and treatment progress using the local LLM and adjusting the CBT treatment plan based on the reassessment.

The device operation includes receiving text, email, and chat communications data from a user's mobile device; analyzing the communications data using natural language processing to detect linguistic patterns indicative of mental health issues; receiving heart rate data from a wearable heart rate monitor worn by the user; analyzing the heart rate data to identify patterns associated with anxiety, stress, or other mental health conditions; detecting a potential mental health issue based on the analysis of the communications data and heart rate data; generating personalized CBT exercises tailored to the detected mental health issue using the local LLM on the mobile device; presenting the personalized CBT exercises to the user via a mobile application; tracking user engagement with the CBT exercises and adjusting the exercises based on the tracked engagement using the local LLM; periodically reassessing the user's mental health condition by analyzing new communications and heart rate data; modifying the CBT treatment plan based on the reassessment using the local LLM.

The method can include receiving financial data from one or more financial sources, including Quicken, bank records, credit card records, charges from online companies, mortgage interest rates, and spending habits; analyzing the financial data using the local LLM to identify patterns indicative of financial problems, high-interest rate balances, spending patterns, emergency funds, and outstanding debt; applying the local LLM to create budgets, prioritize spending to minimize debt costs, and manage investments and savings; generating personalized CBT exercises to improve financial health; tracking user engagement with the CBT exercises and adjusting the exercises based on the tracked engagement using the local LLM.

The assisting a user to automatically handle email, chat, and messaging requests by, can include receiving email, chat, and messaging data; analyzing the received data using the local LLM to identify requests that require action, including scheduling meetings and responding to inquiries; generating suggested responses or actions for the detected requests using the local LLM and presenting the suggested responses for user approval; tracking user engagement with the suggestions and retraining the local LLM based on user engagement to improve future recommendations.

The method can include receiving GPS location data, calendar events, health data, email data, chat data, and messaging data; analyzing the received data with the local LLM to identify patterns and contextual information relevant to user daily activities; generating a contextual suggestion for optimizing daily activities based on the analysis, wherein the suggestion includes one or more of the following: prioritizing and categorizing incoming emails, chat messages, and text messages based on their content and urgency; drafting responses to routine inquiries using the local LLM; flagging selected messages for human review; organizing emails, chat messages, and text messages into folders based on content and context; providing travel tips and recommendations based on traffic conditions, including suggesting alternative routes to avoid congestion; recommending nearby restaurants or coffee shops based on the user's current location and meeting schedules; offering proactive reminders about upcoming tasks and appointments by analyzing calendar events and deadlines; suggesting adjustments to a daily schedule to optimize time usage including scheduled meetings or drive times based on traffic conditions; preparing and formatting documents according to specified templates, proofreading and suggesting edits for grammar and style, generating presentation slides based on provided content, and creating detailed itineraries.

The method can also include analyzing by the local LLM a communication content and detecting one or more indicators of fraud; comparing a sender domain against a database of official company domains to identify mismatches or slight misspellings indicative of fraud; verifying a sender authority by abstracting the communication content to preserve privacy and sending a verification email from the local LLM to one or more official company domains; generating with the local LLM a set of validation queries to the sender based on the communication content, including requests to verify identity, provide documentation, and details supporting the request; analyzing responses to the validation queries by the local LLM for inconsistencies or red flags; updating a fraud risk assessment based on the responses to the validation queries.

The method can also include collecting email, chat, and message communications data; analyzing the collected communications data using natural language processing to create question-and-answer pairs; applying data augmentation to the question-answer pairs to increase the diversity of the data; using the question-and-answer pairs from communications and user interactions to fine-tune the local LLM.

The method can also include generating a set of targeted questions based on the analysis of the communications data, designed to fill knowledge gaps in the local LLM; receiving and storing answers to the generated questions in the encrypted vector database; applying data augmentation to the collected question-answer pairs to increase the diversity of the data; using the collected question-and-answer pairs from communications and direct user interactions to fine-tune the local LLM.

The method can further include receiving user input specifying negotiation objectives and criteria; analyzing the user input using the local LLM to identify negotiation parameters and priorities; analyzing a proposal or agreement from a counterparty using the local LLM to identify terms, conditions, and clauses relevant to the user's negotiation objectives; comparing the identified terms, conditions, and clauses against the negotiation parameters and priorities; generating a redlined version showing favorable terms, unfavorable terms and neutral terms; providing explanations for each redlined item, detailing why it is favorable or unfavorable based on the user's objectives and criteria; generating counterproposals for unfavorable terms using the local LLM, taking into account industry standards and best practices; receiving user feedback on the counterproposals; revising the proposal or agreement based on user feedback using the local LLM.

The method can include analyzing communication data and search data to identify user interests and preferences; generating a list of activities tailored to the user interests and preferences with the local LLM based on user location, calendared travel plan, and location of contacts in a user network; automatically booking one or more activities upon user approval.

The method can include receiving image data of food items consumed by a user; analyzing the image data using a visual large language model to identify food items and estimate calorie content; collecting health data including heart rate, accelerometer data, sleep duration and quality data from sensors on a mobile device or a wearable device; analyzing the collected health data and estimated calorie intake using the local LLM to determine net calorie based on the estimated calorie intake and calorie burn from activities, and using the net calorie to generate personalized health recommendations; generating cognitive behavioral therapy (CBT) exercises based on the personalized health recommendations.

The method includes detecting an imposter user by: comparing user input to stored user behavior patterns, further comprising analyzing one or more of: typing speed and rhythm, writing style and pressure, linguistic patterns, voice pattern, app usage patterns, device interaction styles; user activity context, biometric data from device sensors, device settings and preferences, browsing history, social media activity, device motion patterns, app-specific behavior patterns, device charging patterns, device connectivity patterns, user location patterns, audio data proximal to the user, facial image data of the user, environmental image data around the user, images of people proximal to the user, user gait and movement patterns; generating an imposter risk score based on the comparison and if the imposter risk score exceeds a threshold, generating a knowledge-based challenge question and triggering additional authentication measures if the challenge question is not answered correctly; and triggering a device lockdown if the imposter risk score exceeds a lock threshold.

Advantages may include one or more of the following. The system securely leverages LLMs to enhance user experience in a variety of domains, including but not limited to personal productivity, mental health, healthcare monitoring, financial management, communications, and daily activity optimization, all within a secured computing environment that ensures privacy and data protection. The system is designed for mobile, wearable, vehicle, or IoT devices and is capable of performing a variety of services including health monitoring and suggestions using CBT exercises, financial advice, automated communications handling, and personalized daily activity optimization. It can detect fraud, fine-tune responses using augmented user interaction data, assist in negotiations, identify personal interests for activity booking, and provide health recommendations based on dietary intake and physical activity. The system enhances user privacy and data security while offering tailored support through its onboard, internet-independent LLM. These capabilities have opened up new opportunities for enhancing personal productivity, mental health monitoring, automated decision-making, personalized learning, and numerous other applications. The system provides offline, local solutions that maintain the functionality of LLMs without exposing user data to external entities. This is done by integrating a secured, local large language model that operates within a private computing environment. A firewall restricts data access purely to locally stored information, thereby precluding any communication with external servers or internet-based resources. This provides users with the benefits of advanced language processing and personalization while retaining full control over their privacy. The secure mobile device application utilizes a local large language model (LLM) to provide personalized assistance while maintaining user privacy. The system operates within a firewall that restricts the LLM to data only within the secured computing environment, without accessing the Internet. It uses an encrypted vector database to store user data, including personal information, communications, health data, financial records, and location data. The system applies retrieval-augmented generation (RAG) to efficiently process and generate responses based on the stored data.

Other advantages may include the following. The LLM performs various tasks such as email management, scheduling, financial analysis, health monitoring, and cognitive behavioral therapy (CBT) exercises. It can detect potential imposters by analyzing user behavior patterns, biometrics, and contextual data. The application offers personalized recommendations for daily activities, health improvements, and financial management. The system implements advanced security measures, including data encryption, secure enclaves, and automatic device wiping if unauthorized access is detected. It leverages specialized hardware, including AI accelerators and neural processing units, to efficiently run the LLM on mobile devices. Various techniques for model compression, quantization, and optimization are employed to enable powerful AI capabilities within mobile hardware constraints. The LLM can be fine-tuned through user interactions and expert-driven Q&A sessions to improve its performance and domain-specific knowledge. The application aims to provide a comprehensive, AI-driven personal assistant that prioritizes user privacy and data security while offering a wide range of sophisticated features and capabilities.

Yet other advantages may include one or more of the following. The small local LLM design significantly improves computer performance on mobile and IoT devices through several key optimizations. Its compact architecture, with a few million parameters across a small number of transformer layers, allows the entire model to fit within small mobile memory and yet provide LLM power. The model employs 8-bit quantization for all weights and activations, reducing memory requirements and computational complexity. It implements sparse computation techniques and uses a shared feed-forward network across layers to further reduce parameter count. The LLM includes an optimized inference engine that efficiently manages model execution, memory usage, and sparse matrix operations. Hardware optimizations leverage specialized support for sparse and low-precision operations, including systolic array structures for matrix multiplication and SIMD extensions for vector operations. The model utilizes specialized cache designs and hardware prefetchers to optimize memory access patterns common in sparse matrix operations. Mixed-precision training techniques balance accuracy and efficiency.

Yet other advantages may include the following. The system improves computer performance by being optimized for resource constraints of the mobile devices and wearables. These optimizations allow the small local LLM to provide useful language understanding and generation abilities while operating within the strict power, memory, and computational constraints of mobile and IoT devices. By processing data locally, the model improves privacy and reduces latency compared to cloud-based alternatives. The efficient design enables more advanced AI features on resource-constrained devices while maintaining reasonable battery life and performance. LLM performance on the small model is high due to use of training on chat and expert information derived from Q&A sessions with the user and from email/text/chat communications which are equivalent to the Q&A sessions. In this manner, the local LLM architecture and training enables the LLM to run on resource constrained devices such as wearables and mobile devices. The local LLM improves computer performance by operating entirely on the mobile device, eliminating the need for internet connectivity and reducing latency. It uses a compact architecture with only 1 million parameters across 4 transformer layers, allowing the entire model to fit within 128 KB of memory. This significantly reduces computational requirements compared to traditional cloud-based LLMs. The encrypted vector database improves data security and privacy while maintaining efficient retrieval for AI operations. It uses techniques like dimensionality reduction and encryption to protect sensitive information. The vector representations allow for semantic search and similarity comparisons without exposing raw data, improving both privacy and computational efficiency. RAG improves the LLM's performance by allowing it to access relevant information from the vector database efficiently. This reduces the need for the model to store all information in its parameters, enabling a smaller model size while maintaining high-quality outputs. The firewall improves security by restricting the LLM's access to only data within the secured computing environment. This prevents unauthorized data transmission and protects against external threats, enhancing overall system integrity. The dedicated AI processor or Neural Processing Unit (NPU) significantly improves performance for AI tasks. It uses specialized architectures like systolic arrays for matrix multiplication, SIMD vector engines for parallel processing, and sparse tensor cores for efficient sparse computation. This allows for more advanced AI features while maintaining reasonable battery life on mobile devices. Quantization for weights and activations, along with sparse computation techniques, reduces memory requirements and computational complexity. This allows the LLM to operate efficiently on resource-constrained devices. Techniques like mixed-precision training, knowledge distillation, and efficient optimization algorithms improve the model's performance while reducing computational requirements during training. The inference engine is highly optimized for mobile devices, with careful memory management, sparse matrix operations, and hardware-specific optimizations. This allows for fast and energy-efficient inference on mobile processors. These improvements collectively enable sophisticated AI capabilities on mobile devices while maintaining privacy, security, and energy efficiency.

In another aspect, the local LLM is trained or refined from email, chat or messaging conversations and additionally from question and answer sessions with a subject and evaluating a model quality with a set diverse questions and utilizing a third party LLM to judge model outputs by combining outputs from the models into a single prompt for each question and assessing the output by the third party LLM.

The approach of training or refining a local Large Language Model (LLM) using email, chat, messaging conversations, and question-answer sessions with a subject, combined with evaluation using diverse questions and a third-party LLM judge, can significantly improve computer performance in several ways:

a. Personalization and Efficiency: By training on user-specific data from emails, chats, and messages, the local LLM becomes highly personalized to the user's communication style, vocabulary, and context. This personalization allows the model to generate more accurate and relevant responses, reducing the need for multiple iterations or clarifications. As a result, the system can complete tasks more efficiently, saving computational resources and improving overall performance.

b. Reduced Data Transfer: With a well-trained local LLM, the need to constantly query external servers or larger models is significantly reduced. This decreases network usage and latency, leading to faster response times and lower energy consumption, which is particularly beneficial for mobile and IoT devices.

c. Continuous Learning: The method of refining the model through question-answer sessions allows for continuous improvement without the need for large-scale retraining. This adaptive learning approach means the model can stay up-to-date with changing user needs and contexts, maintaining high performance over time without requiring extensive computational resources for full retraining.

d. Targeted Improvement: By using diverse questions to evaluate model quality, the system can identify specific areas where the local LLM needs improvement. This targeted approach allows for more efficient use of computational resources during the refinement process, focusing only on areas that need enhancement rather than unnecessarily processing already well-performing aspects of the model.

e. Quality Assurance: Utilizing a third-party LLM to judge model outputs provides an additional layer of quality control. This approach can help identify potential biases or errors in the local LLM's outputs, allowing for more accurate and reliable performance. By combining outputs from different models into a single prompt for each question, the system can leverage the strengths of multiple models, potentially leading to higher quality results.

f. Optimized Resource Allocation: The evaluation process using diverse questions and a third-party LLM judge allows the system to allocate computational resources more effectively. By understanding which types of queries the local LLM handles well and which it struggles with, the system can optimize when to use the local model versus when to defer to other resources, balancing performance and efficiency.

g. Enhanced Privacy and Security: By refining the local LLM using on-device data and processing, the system reduces the need to send sensitive information to external servers. This not only improves privacy but also reduces the computational overhead associated with extensive data encryption and secure transmission protocols.

h. Reduced Latency: A well-trained local LLM can provide faster responses to user queries, especially for common or personalized tasks. This reduces the overall latency of the system, improving the user experience and allowing for more responsive applications.

i. Battery Life Optimization: For mobile devices, the ability to process more queries locally using a refined LLM can lead to significant battery life improvements. By reducing the need for constant network communication and leveraging efficient, on-device processing, the system can operate for longer periods between charges.

j. Scalability: This approach allows for better scalability across different devices and user scenarios. As the local LLM becomes more efficient and personalized, it can handle a wider range of tasks without requiring constant updates or access to more powerful cloud-based models. The training, refining, and evaluating the local LLM leads to a more efficient, personalized, and high-performing system. It optimizes resource usage, improves response times, enhances privacy, and allows for continuous improvement without the need for constant large-scale retraining or extensive cloud computing resources.

DETAILED DESCRIPTION OF THE INVENTION

Figure 1:
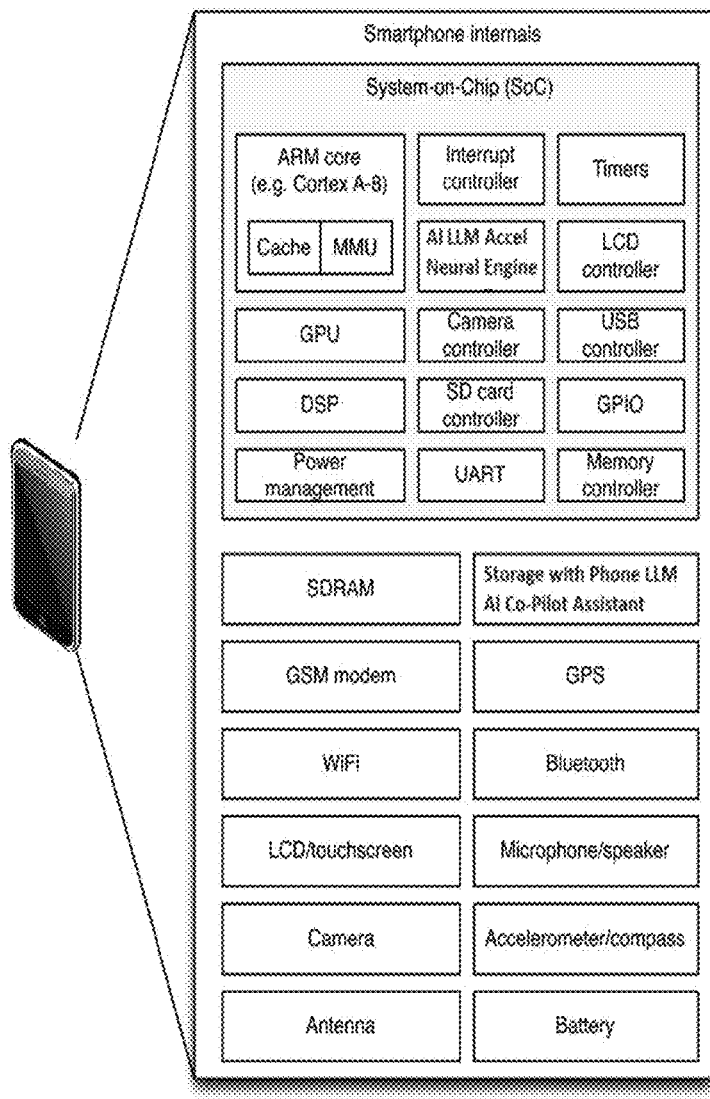
FIG. 1 shows an exemplary AI enable mobile device.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 shows an exemplary AI Smart Phone to run the Personal Assistant Neural Engine. A System-on-Chip (SoC) integrates multiple components into a single package and includes a multi-core CPU, often based on ARM architecture, featuring a combination of high-performance and energy-efficient cores. For instance, the Google Pixel 7a utilizes a Google Tensor G2 chip with two ARM Cortex-X1 cores for demanding tasks, two Cortex A78 cores for balanced performance, and four Cortex A55 cores for energy-efficient background processes. Alongside the CPU, the SoC incorporates a Graphics Processing Unit (GPU) for handling display rendering, a memory controller for managing RAM access, and integrated modules for cellular connectivity, WiFi, Bluetooth, and GPS functionality. Complementing the SoC, the phone has from 4 GB to 12 GB of LPDDR4 or LPDDR5 memory. This allows for smooth multitasking and efficient app management. For storage, devices utilize flash memory, with capacities usually between 64 GB and 1 TB, providing ample space for the operating system, applications, and user data. The user interface is centered around a high-resolution touchscreen display, often employing OLED or AMOLED technology for vibrant colors and energy efficiency. Power is supplied by a rechargeable lithium-ion battery, while multiple camera modules enable versatile photography and video capture capabilities. A array of sensors, including accelerometers, gyroscopes, proximity sensors, and ambient light sensors, enhance the device's awareness of its environment and user interactions.

A dedicated AI or Neural Processing Unit (NPU) is tightly coupled with the main SoC and is optimized for machine learning inferencing tasks. The NPU allows smartphones to perform complex AI operations with significantly lower power consumption compared to running these tasks on the main CPU. This enables a wide range of on-device AI capabilities, including advanced image and speech recognition, natural language processing, computational photography enhancements, and augmented reality features. By performing these operations locally, the NPU improves privacy and reduces latency compared to cloud-based processing. The AI processor is specifically designed to excel at the types of computations common in neural network inferencing, such as matrix multiplication. This specialization allows it to process AI workloads much more efficiently than a general-purpose CPU, enabling more advanced AI features while maintaining reasonable battery life. Additionally, many modern smartphones incorporate a secure enclave, a separate processor dedicated to handling sensitive operations like biometric authentication, further enhancing the device's security capabilities.

In one embodiment, the AI LLM Neural Engine is a dedicated AI processor or Neural Processing Unit (NPU) optimized for machine learning inferencing. This processor would be designed to efficiently perform the matrix operations and other computations common in LLM inference. The AI neural engine uses a highly parallel architecture with multiple processing elements capable of performing vector and matrix operations simultaneously. The AI processor would incorporate significant on-chip memory with high-bandwidth, low-latency SRAM for storing frequently accessed model parameters and intermediate results. Larger, but slower embedded DRAM is used for holding the full model weights. MRAM or ReRAM could be used for their low power consumption and non-volatility. The hardware would be designed to work with quantized models, supporting operations on lower precision data types (e.g., 8-bit integers instead of 32-bit floating point). This reduces both memory requirements and computational complexity. Given that many LLMs benefit from sparsity (many weights being zero), the hardware can include specialized units for efficiently processing sparse matrices and tensors. features of sparse computation units may include:

Hardware support for storing sparse matrices in compressed formats like Compressed Sparse Row (CSR) or Compressed Sparse Column (CSC). This reduces memory bandwidth requirements. Zero-skipping can be supported with the ability to quickly skip over zero values during matrix multiplication operations, reducing the number of computations required. Indexing hardware can use dedicated circuitry for efficiently handling the index arrays used in sparse matrix formats. Load balancers can distribute sparse workloads evenly across multiple processing elements.

Systolic array structures are commonly employed for efficient matrix multiplication operations, which are prevalent in neural networks. These architectures also often support mixed-precision operations, allowing them to work with reduced precision data types like 8-bit integers for increased efficiency. Additionally, they may include dedicated hardware support for common tensor operations such as convolutions.

Certain embodiments incorporate SIMD (Single Instruction, Multiple Data) extensions optimized for vector and matrix operations. These extensions can be leveraged for efficient sparse matrix processing. Gather-scatter instructions allow for efficient loading and storing of non-contiguous data elements, which is particularly useful for sparse matrix formats. Masked operations enable selective application of operations based on a mask, facilitating the processing of sparse data.

Efficient sparse matrix processing also relies on optimizations in the memory hierarchy. Specialized cache designs are implemented to optimize for the access patterns common in sparse matrix operations. Hardware prefetchers are designed to predict and load sparse matrix elements ahead of time, improving overall performance.

Certain implementation uses dataflow architectures, which can be particularly efficient for sparse operations. These architectures feature data-driven execution, where operations are triggered by the availability of non-zero data, naturally skipping over zero values. They also employ fine-grained parallelism, allowing for efficient utilization of hardware resources even with irregular sparse patterns.

These specialized units and architectural features allow mobile processors to efficiently handle the sparse matrices and tensors common in many AI and machine learning models, enabling more powerful AI capabilities on mobile devices while minimizing power consumption.

The dedicated AI accelerators with various architectures and features to enhance performance and efficiency. These include systolic array architectures for matrix multiplication, SIMD vector engines for parallel processing, dataflow architectures to minimize data movement, and sparse tensor cores for efficient sparse computation. Key features of these accelerators include mixed-precision support, flexible datapaths, large on-chip memory and caches, and high memory bandwidth to external DRAM. Specialized hardware for sparse operations includes compressed sparse matrix formats, zero-skipping, dedicated indexing hardware, and load balancing mechanisms. Hardware quantization support enables efficient int8 matrix multiplication, mixed-precision accumulation, quantization/dequantization units, and lookup tables for non-linear functions. Memory hierarchy optimizations are crucial, incorporating scratchpad memories, prefetching mechanisms, compression techniques, and near-memory processing. Close software/hardware co-design enables custom instructions, kernel fusion, graph compilers, and dynamic load balancing. Inference optimization techniques include graph optimization, kernel optimization, sparse and quantized inference, memory optimizations, intelligent caching and prefetching, and batching and pipelining strategies. System-level optimizations focus on efficient memory management through compressed storage formats, page-based management, pooling, defragmentation, and swapping to storage for large models.

The AI neural engine can be used for advanced computational photography techniques like portrait mode and night mode, as well as real-time image and video processing. Natural language processing powers voice recognition and predictive text, while face recognition enhances security for device unlocking and payments. AI chips facilitate augmented reality applications, health and fitness tracking through activity recognition, and optimize battery life and overall device performance. They enable on-device language translation, audio processing with noise cancellation, and gesture recognition. The chips also enhance photo and video capabilities with scene detection and object recognition. Biometric security features like fingerprint and iris scanning benefit from on-device AI, as do contextual awareness features for smart notifications. In gaming, AI chips can create more intelligent opponents and improve graphics. They power voice assistants, enable handwriting recognition, apply real-time video effects and filters, and drive personalized content recommendations. This diverse range of applications showcases how on-device AI chips are transforming smartphones into more intelligent, efficient, and personalized devices, all while maintaining user privacy through local processing.

For power efficiency, multiple power domains allows unused sections to be completely powered down. Dynamic voltage and frequency scaling (DVFS) to adjust performance and power consumption based on workload. Fine-grained clock gating to reduce dynamic power consumption in idle units. A DMA-like engine optimized for the specific data access patterns of LLM inference could efficiently move data between different memory hierarchies and processing units, minimizing energy spent on data movement. Dedicated hardware blocks for common LLM operations like attention mechanisms or activation functions can provide additional efficiency gains. For security, the device has a secure enclave for processing sensitive data and hardware encryption/decryption units to protect model weights and input data. A hardware compression/decompression unit could reduce the memory footprint of the model and the bandwidth required for data movement. Adaptive Precision Units can dynamically adjust the precision of computations based on the requirements of different parts of the model or different inference tasks.

Alternative implementation of the AI accelerator can include one or more of the following. In-memory computing aims to overcome the von Neumann bottleneck by performing computations directly within memory arrays. This can dramatically reduce data movement and energy consumption. Analog and photonic computing leverage the continuous nature of analog signals and the speed of light to perform matrix operations more efficiently than digital circuits. 3D-stacked memory and logic integrates memory and processing elements in a 3D structure, increasing bandwidth and reducing latency between compute and memory. Neuromorphic architectures take inspiration from biological neural networks, using spiking neurons and synapses to process information in an event-driven manner. These approaches offer potential advantages in terms of energy efficiency, speed, and density compared to conventional digital architectures The above designs provide the performance needed for LLM inference while operating within the strict power and thermal constraints of a mobile device. The phones leverage specialized hardware, efficient data movement, and advanced power management techniques to maximize performance per watt. Power gating can be used to completely shut down unused sections of the chip during idle periods. Aggressive clock gating is used to reduce dynamic power consumption in parts of the circuit not actively computing. A power management unit dynamically adjusts voltage and frequency based on the current workload and thermal conditions. The device can quickly transition between active and low-power states, allowing for effective duty cycling of the LLM inferencing engine based on user interaction patterns.

The phone's flash memory contains a secure local AI assistant that includes a vector database communicating with a large language model (LLM) running on the phone. Just as SQL databases handle data in rows and columns, graph databases manage graphs, object databases store objects, vector databases store and manage large data sets of vectors, or vector embeddings. Because AI models work with vector embeddings, vector databases are basically the databases for AI applications. Vector databases offer a feature set of vector operations, most notably vector similarity search, that makes it easy and fast to work with vector embeddings and in conjunction with AI models. The vector database stores and queries high-dimensional vector representations of data, which are typically derived from raw data through various embedding techniques. In a typical scenario, raw data containing PII or sensitive information would first be processed outside the vector database. This processing usually involves converting the raw data into numerical vector representations using machine learning models or other embedding techniques. These vectors are then stored in the vector database. The vector representations themselves do not directly contain the original PII or sensitive data, but rather represent the semantic or feature-based essence of that data in a high-dimensional space. For example, a person's name might be converted into a vector that captures certain linguistic properties, or a facial image might be transformed into a vector representing key facial features. The vector can cover all information processed by the phone as a personal information management system which would potentially process and store personal identification information such as full names, dates of birth, social security numbers, home addresses, email addresses, and various phone numbers. It would also need to securely manage passwords and PINs for multiple accounts, as well as biometric data like fingerprints and facial recognition data. Financial information would be a critical component, including bank account details, credit/debit card numbers, online banking credentials, investment account information, and even tax records and financial statements. The system would also handle extensive communication data, encompassing text messages, chat logs, email contents and attachments, voicemails, and call logs. Location data would be another sensitive area, tracking GPS coordinates, location history, frequently visited places, and travel itineraries. Personal media such as photos, videos, audio recordings, and personal documents would need secure storage and management. Health information, including medical records, fitness tracking data, medication information, and doctor's appointments, would require special protection due to its sensitive nature. Work-related information like corporate emails, client communications, and confidential business plans would also be part of this system. Additionally, the system would need to handle data from various social media platforms like Facebook, Twitter, and LinkedIn, as well as GPS location data, voice calls, and text messages. Managing all this diverse and highly sensitive information would require robust encryption, strict access controls, and compliance with various data protection regulations to ensure user privacy and data security.

The distributed training process for a local LLM on a mobile device begins by initializing the model and partitioning it into multiple segments. These segments are then distributed across various processing units within the device, including the central processing unit (CPU), graphics processing unit (GPU), and neural processing unit (NPU). This approach allows for efficient utilization of the device's computational resources.

Training data is collected from various sources on the mobile device, such as user interactions, device usage patterns, sensor data, and locally stored content. This data is preprocessed to remove personally identifiable information, ensuring user privacy. The training process employs federated learning techniques, allowing collaboration with other devices while maintaining data privacy. This includes secure aggregation of model updates across devices and the use of differential privacy mechanisms to add noise to individual contributions.

The training algorithm applies distributed optimization techniques to train the LLM segments in parallel. This includes methods such as distributed stochastic gradient descent and model parallelism for efficient parameter updates. To optimize memory usage and computational efficiency, the process utilizes mixed-precision training and implements gradient compression and quantization techniques to reduce communication overhead between processing units.

The training process incorporates adaptive learning rate scheduling to optimize convergence across distributed segments. Periodically, the model updates are synchronized and aggregated across the distributed segments. Continual learning techniques are employed to adapt the model to new data without catastrophic forgetting. The trained model is evaluated using local validation data and predefined performance metrics.

Finally, the model undergoes fine-tuning based on user feedback and task-specific requirements. The trained model is stored in an encrypted format within the device's secure enclave, and the local LLM is updated with the newly trained parameters while maintaining version control and rollback capabilities. This comprehensive approach enables efficient and secure distributed training of a local LLM on a mobile device, leveraging the device's full computational potential while preserving user privacy.

The mobile phone can capture and store a wide range of confidential information through various user activities. This includes personal identification information such as full names, dates of birth, social security numbers, home addresses, email addresses, phone numbers (personal, work, emergency contacts), passwords, PINs for various accounts, and biometric data like fingerprints and facial recognition data. Financial information is also stored, including bank account details, credit/debit card numbers, online banking login credentials, investment account information, and tax records and financial statements. Communication data encompasses text messages, chat logs, email contents and attachments, voicemails, and call logs. Location data includes GPS coordinates, location history, frequently visited places, and travel itineraries. Personal media such as photos, videos, audio recordings, and personal documents are also stored. Health information includes medical records, fitness and health tracking data, medication information, and doctor's appointments and reminders. Work-related information stored on mobile phones includes corporate emails and documents, client information and communications, confidential business plans and strategies, and login credentials for work-related accounts. Online activity data includes browsing history, search queries, login credentials for various websites and apps, and social media activity and private messages. Device and app data include installed apps and their usage data, device settings and preferences, Wi-Fi networks and passwords, and Bluetooth pairing information. Payment information stored on mobile phones includes digital wallet contents, online shopping history and preferences, and subscription details. Legal documents such as contracts and agreements, identification documents (driver's license, passport scans), and legal correspondence are also stored. Personal preferences and habits include app usage patterns, content consumption habits (music, videos, books), and calendar events and schedules. Educational information includes student records, course materials and assignments, and academic credentials. Vehicle information includes car registration details, insurance information, and connected car data if linked to the phone. This extensive range of confidential information can be captured through various means, including user input, app permissions, system logs, and device sensors. The accumulation of this data on mobile phones makes them potential goldmines of personal and sensitive information, highlighting the critical importance of implementing robust security measures to protect this data from unauthorized access or breaches.

In one embodiment, an app collects all user GPS location, texting, emailing, video conferencing call, and phone call data in addition to the aforementioned information and stores such information in an encrypted vector database. The system then applies retrieval-augmented generation (RAG) to send information to a local large language model (LLM) that is isolated from the internet via a firewall. The LLM serves as a trusted personal assistant to carry out tasks for the user. Any information sent to the internet is anonymized. The LLM knows from the calendar and call data what the user needs to be done and performs these tasks for the user. If the phone is lost or an unknown user attempts to breach the LLM, the system wipes the phone to protect user privacy. The LLM has access to wearable health data and can perform cognitive behavioral therapy (CBT) to help the user improve health. Similarly, the LLM can help the user take specific steps by specific deadlines to improve their financial score. The LLM knows about the stock portfolio and can act as a financial advisor, helping the user take specific steps by specific deadlines to improve their financial score. In one embodiment, the LLM can query through intermediaries on web3 sites to easily get data needed to perform tasks for the user. If the compute requirement is too intensive, the LLM can use encrypted edge processing to save battery life.

The local LLM is protected by a mobile device app firewall acting as a security measure to control and monitor network traffic to and from the LLM application on a desktop or a mobile device. The firewall monitors and filters incoming and outgoing network traffic, ensuring that only authorized communications are allowed. It enforces predefined security rules to determine which types of traffic are permitted or blocked, enhancing the device's security. The firewall can restrict or allow network access for specific applications, ensuring that only trusted apps can communicate over the network. This application control feature is crucial for maintaining the integrity of the device's data and preventing unauthorized access. By controlling network traffic, the firewall helps protect sensitive data on the mobile device from being accessed or transmitted without authorization. Predefined or customizable security rules dictate how network traffic is handled for different apps. These rules can be tailored to meet the specific needs of the user or organization, providing flexibility and enhanced security. The firewall also detects and prevents unauthorized access attempts, protecting the device from potential intrusions and cyber-attacks. Built-in tools help meet regulatory requirements like GDPR, CCPA, and industry-specific regulations, ensuring compliance and enhancing the device's security posture. A user-friendly interface allows users to configure and manage firewall settings easily, making it accessible even to those without extensive technical knowledge. Users can tailor firewall settings to their specific needs, including creating custom security rules and permissions. This customization ensures that the firewall can adapt to various security requirements and user preferences. The firewall is designed to handle high volumes of concurrent users and traffic while maintaining responsiveness, often using cloud-based infrastructure, distributed processing, and intelligent caching to optimize performance.

The use of encrypted vector search can potentially improve data privacy in databases in a few ways. Dimensionality reduction—Vector embeddings can represent high-dimensional data in a lower-dimensional space, obscuring some of the original raw data while preserving semantic meaning. This makes it harder to reconstruct the original sensitive information from the vectors alone. Encryption-Vector databases often support encryption of the vector data, both at rest and in transit. This protects the actual vector values from unauthorized access. Vectors can represent anonymized or pseudonymized versions of original data, allowing similarity search without exposing identifiable information. The search techniques can incorporate differential privacy, adding controlled noise to results to prevent leakage of individual data points. Vector databases can support federated learning approaches, where models are trained on distributed data without centralizing raw data. Vector databases use fine-grained access controls to restrict who can query or modify vector data. Vector search allows finding similar items without transferring large amounts of raw data, reducing exposure. Using approximate nearest neighbor search reduces the precision of results slightly, which can help protect individual data points. While vector databases don't directly store raw PII or sensitive data, they should still be treated with appropriate security measures. This includes implementing strong access controls, encryption (both at rest and in transit), and careful consideration of how the vector data is used and queried to prevent potential privacy breaches or unauthorized data reconstruction. In one embodiment, the secure encrypted vector database protects sensitive data while maintaining functionality for AI and machine learning operations. At its core, such a system would employ a robust encryption algorithm like AES-256 to safeguard the vector data, ensuring that even if an attacker gains access to the raw database files, decryption remains infeasible. To enable AI operations on encrypted data, property-preserving encryption techniques can be implemented, allowing for operations like nearest neighbor searches without fully decrypting the vectors. Key management is used, ideally leveraging hardware-backed keystores such as Android Keystore or iOS Secure Enclave to store encryption keys separately from the encrypted data. The database should prioritize local processing to minimize exposure of decrypted information, implement strong authentication and authorization mechanisms to control access, and ensure secure deletion practices when data needs to be removed. If backups are necessary, they too must be encrypted. Following the principle of data minimization, only essential vector data should be stored. Regular security audits should be conducted to address emerging vulnerabilities, and the system should take advantage of platform-level encryption provided by modern mobile operating systems as an additional layer of protection. Rather than implementing encryption from scratch, it's advisable to utilize well-vetted libraries designed for mobile environments that offer secure vector database functionality. This comprehensive approach, combining multiple layers of security, creates a robust defense against potential threats while allowing for efficient AI and machine learning operations on sensitive vector data stored on a smartphone.

A firewalled Large Language Model (LLM) that operates without internet access offers unparalleled security and independence from external threats. This self-contained model runs within its own isolated environment, protected by a robust firewall that prevents unauthorized access from outside. The LLM is designed to operate entirely offline, processing and generating text based solely on its internal knowledge graph and training data. The firewalled LLM receives regular updates from a trusted source, ensuring the model stays current without relying on internet connectivity. This ensures that the model's performance and security are maintained over time. Advanced intrusion detection mechanisms are integrated into the system to detect and respond to potential threats, minimizing the risk of unauthorized access or data breaches. The firewalled LLM is trained using a large corpus of text data, which is stored locally. When new input texts arrive, they are processed offline by the model without accessing external resources. The generated text output is encrypted and stored locally, ensuring it remains confidential. This approach provides unparalleled security against hacking attempts, data breaches, or unauthorized access. The firewalled LLM offers an innovative approach to securing large language models by isolating them from external threats and relying solely on internal knowledge graphs. This concept has significant potential for applications where confidentiality is crucial, but it also presents unique challenges in terms of data storage, update management, and scalability limitations.

Figure 2A:
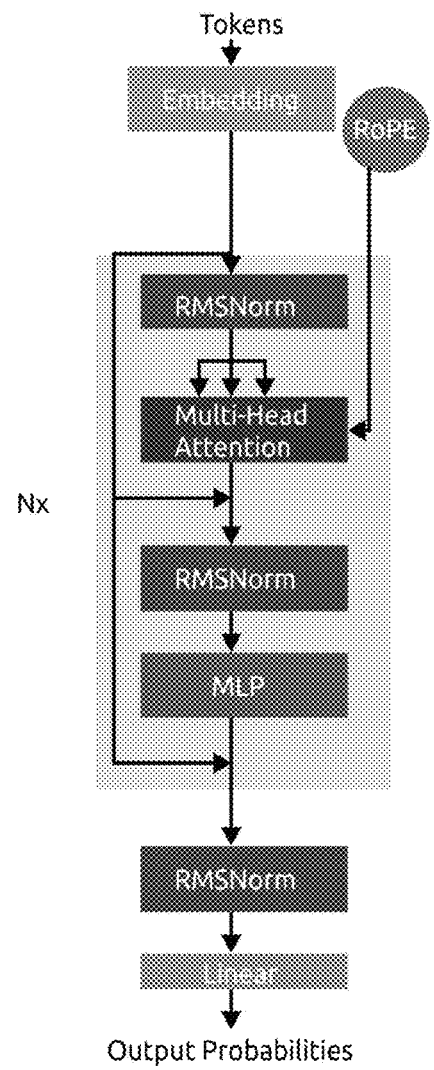
FIG. 2A-2B shows an exemplary local LLM architecture and operation.
Figure 2B:
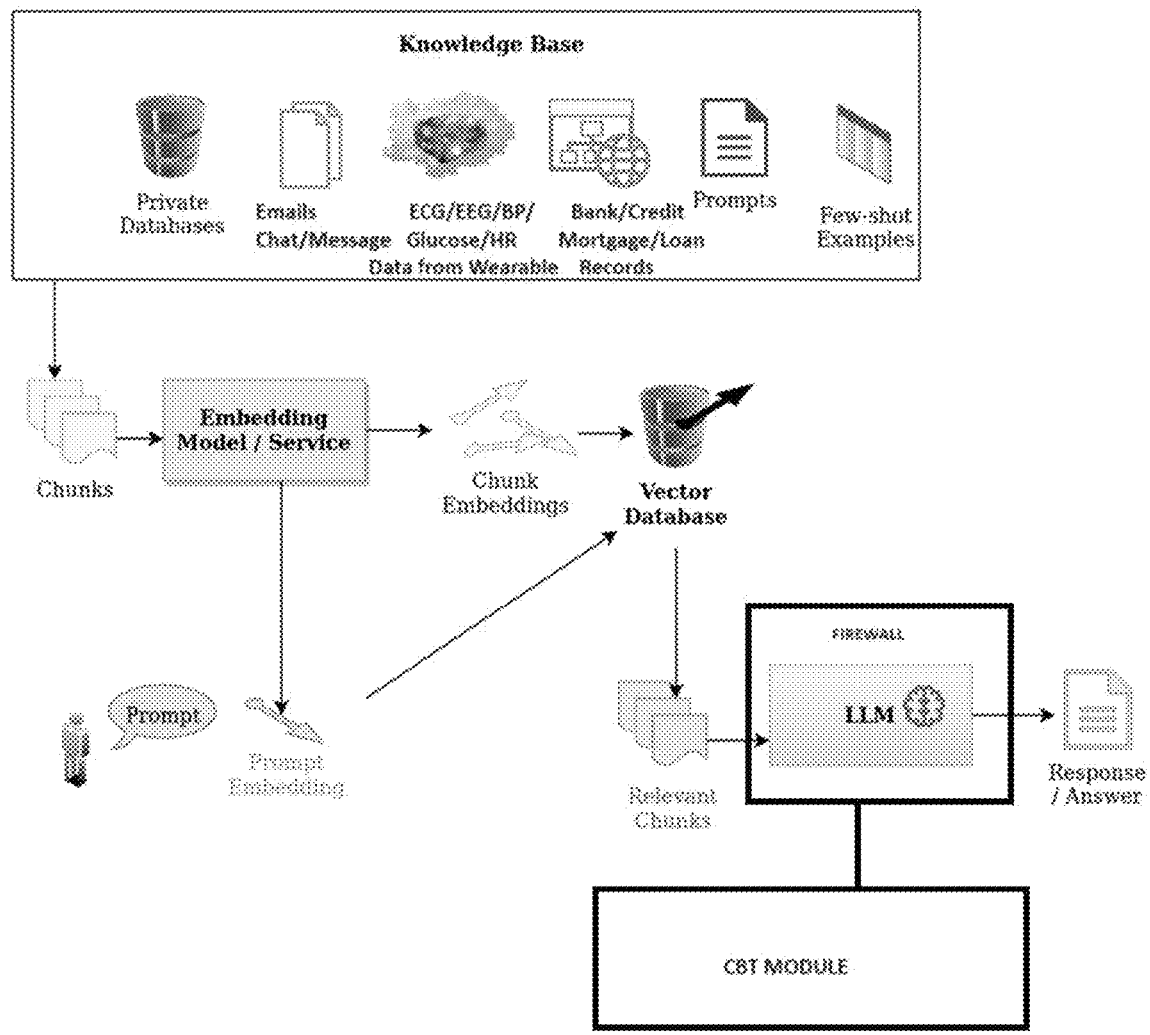
Figure 3:
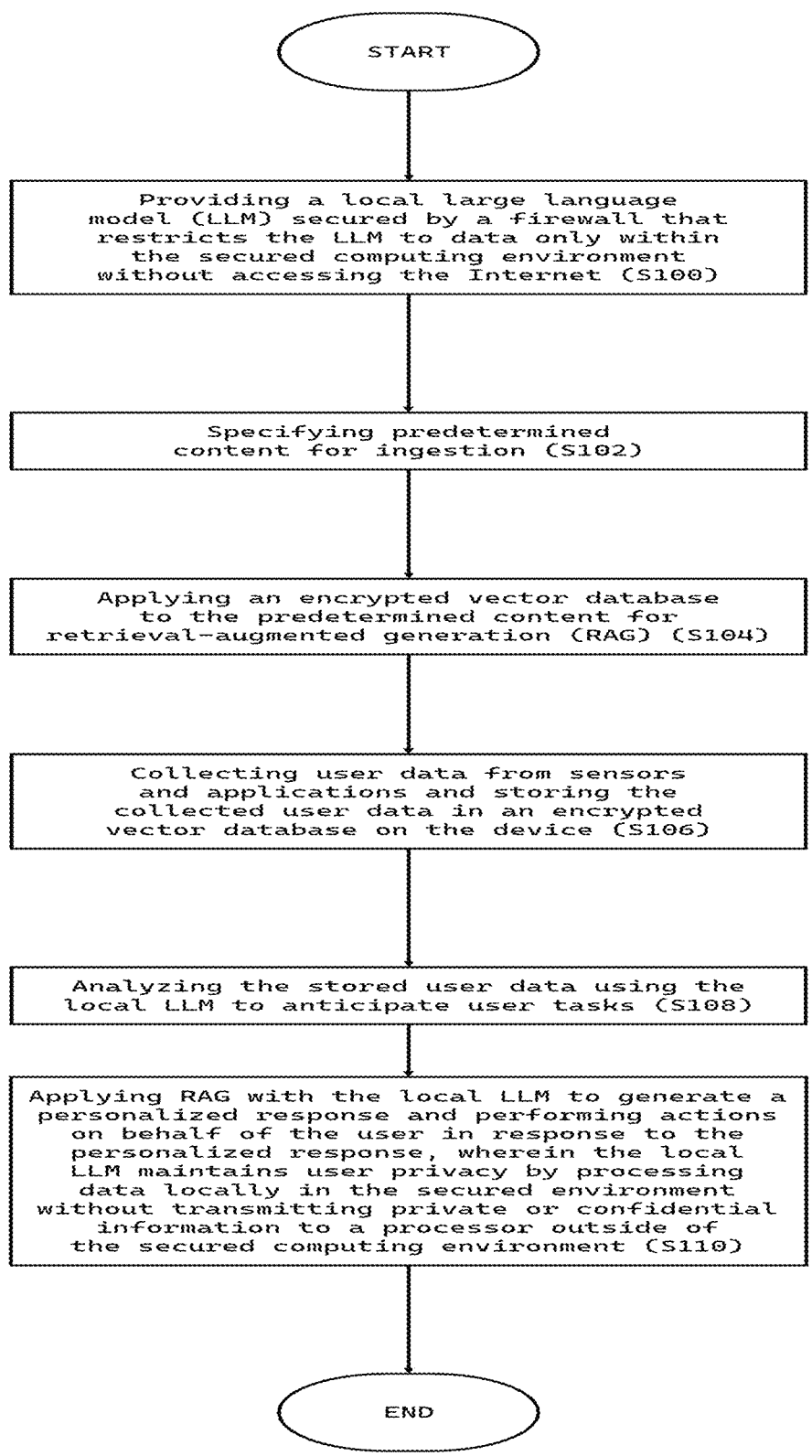
FIG. 3-20 shows exemplary flow charts illustrating the operation of the local LLM to assist mobile device users, to improve/refine LLM knowledge, and to detect imposter access to the LLM.
Figure 4:
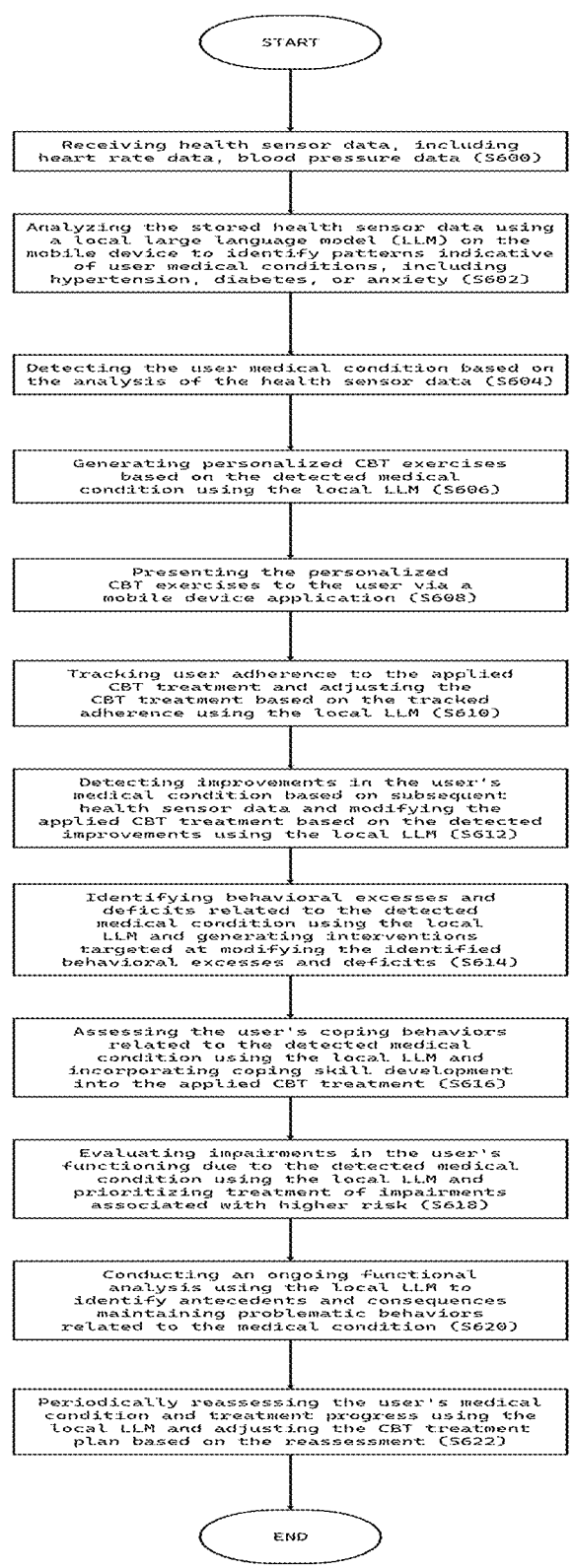
Figure 5:
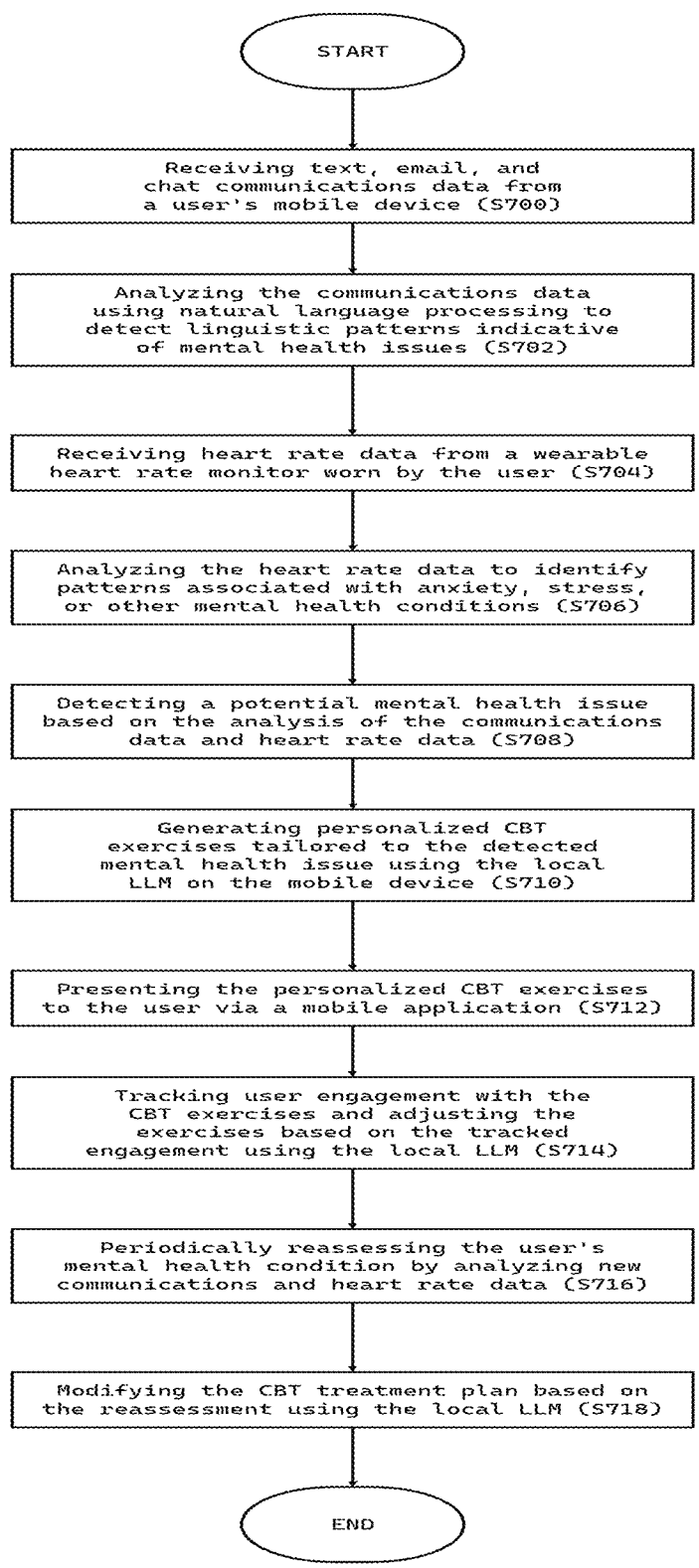
Figure 6:
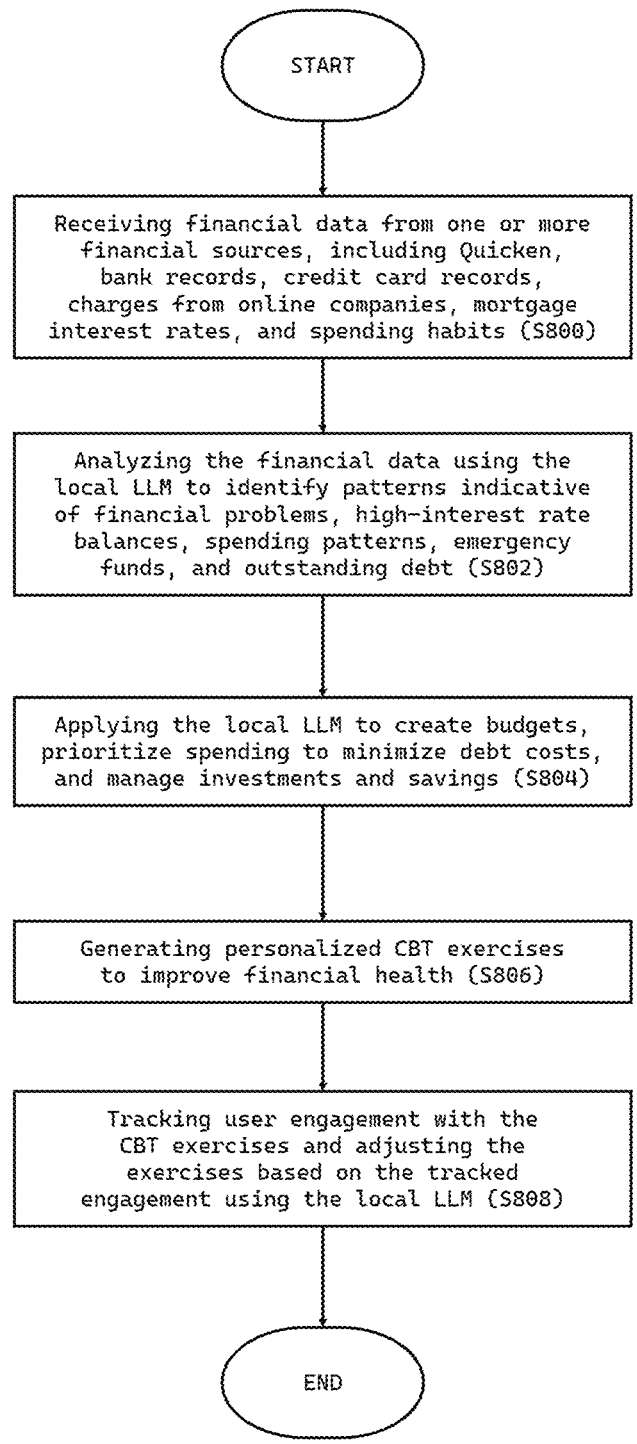
Figure 7:
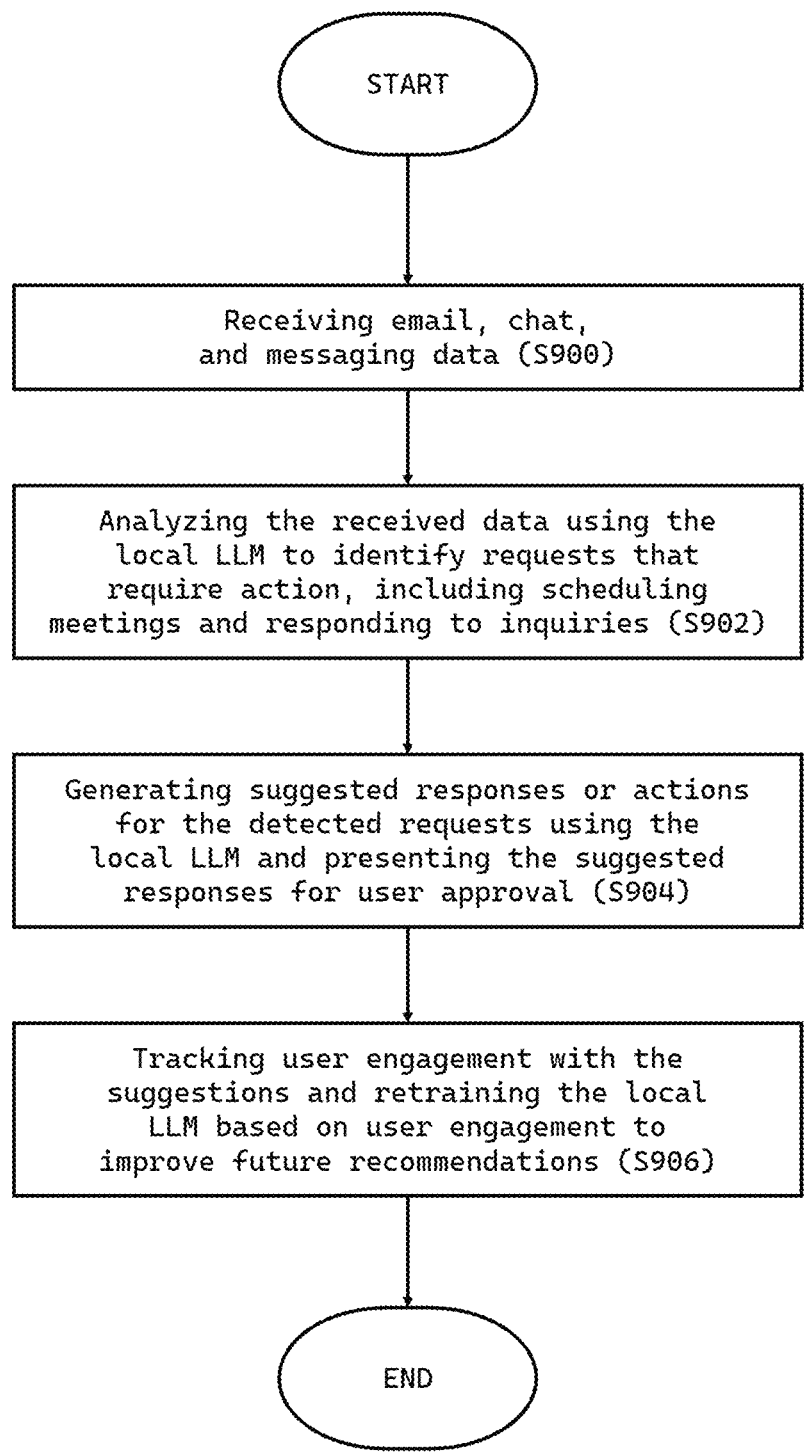
Figure 8:
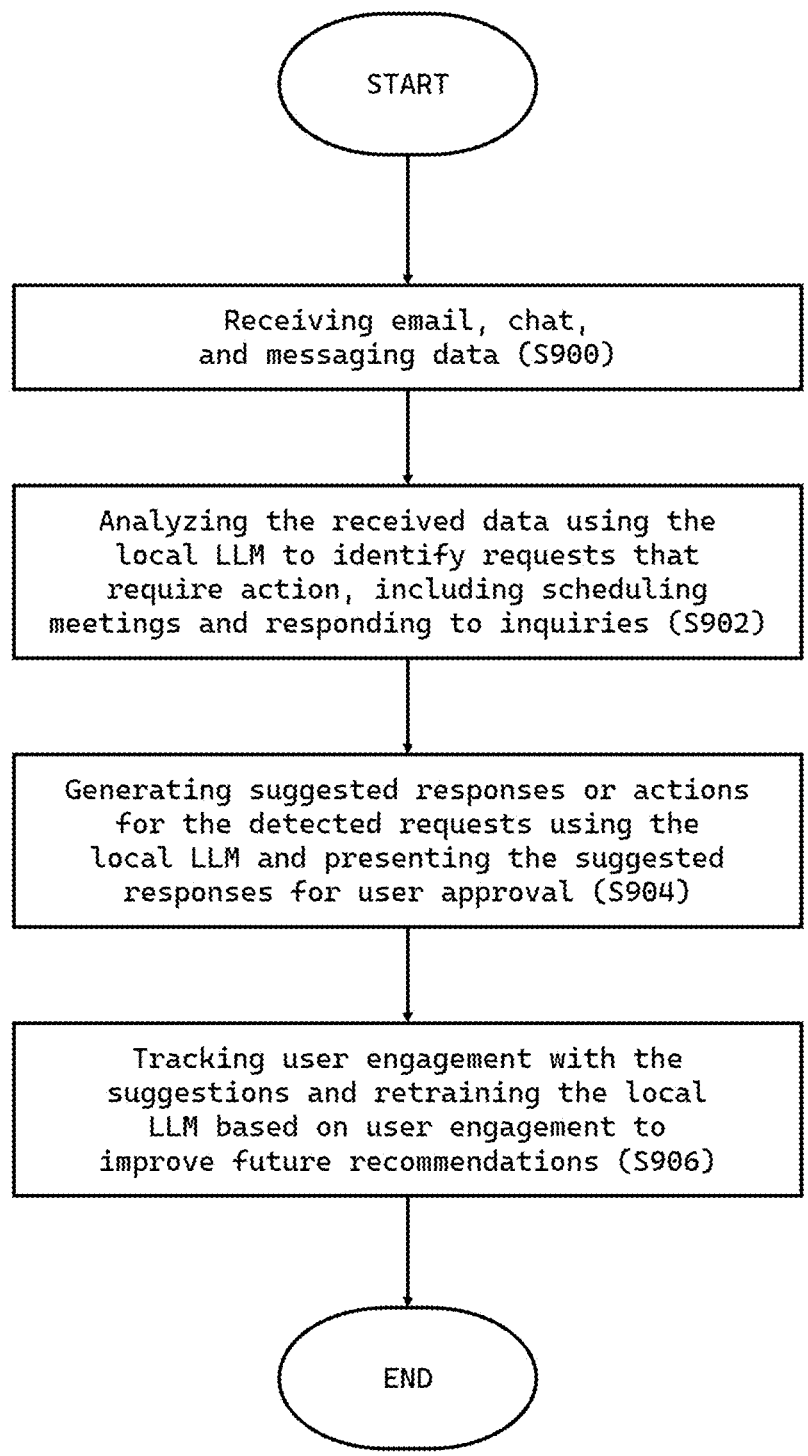
Figure 9:
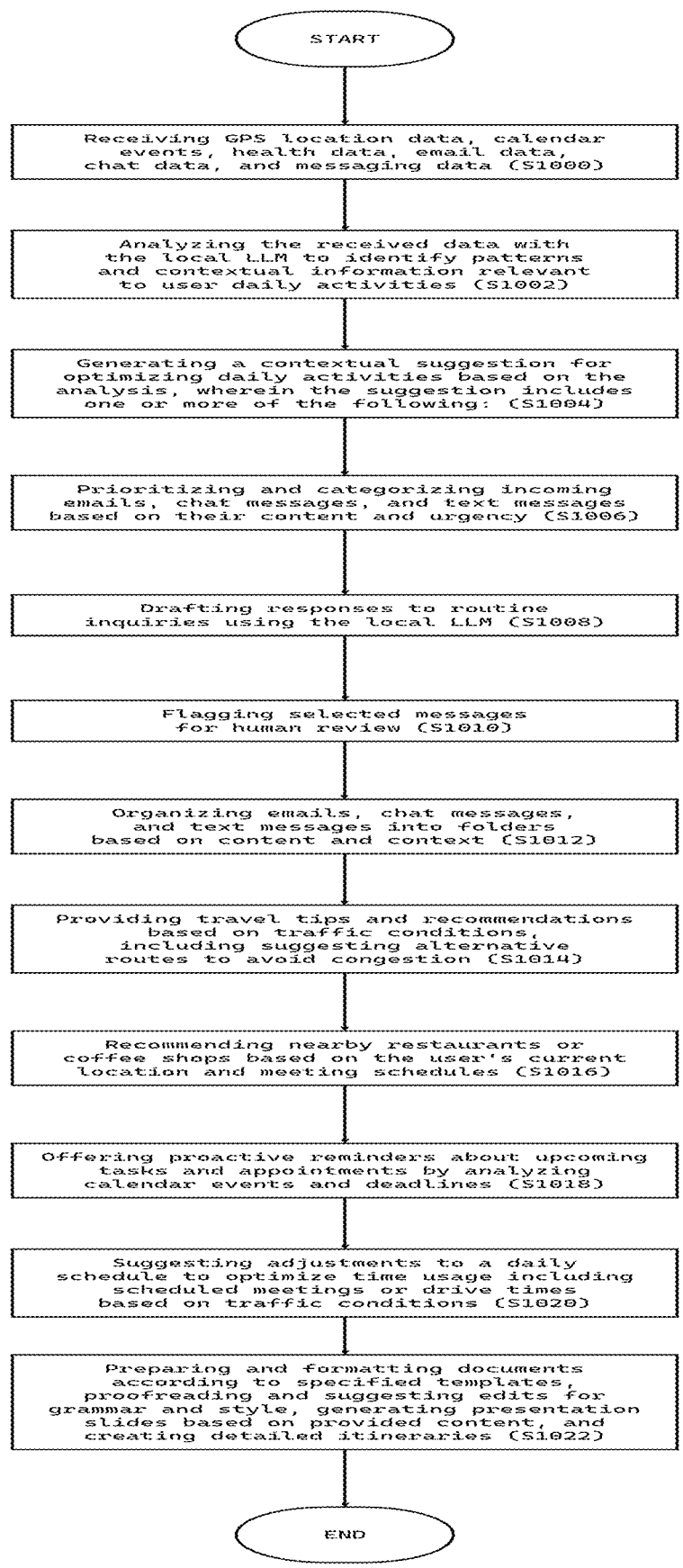
Figure 10:
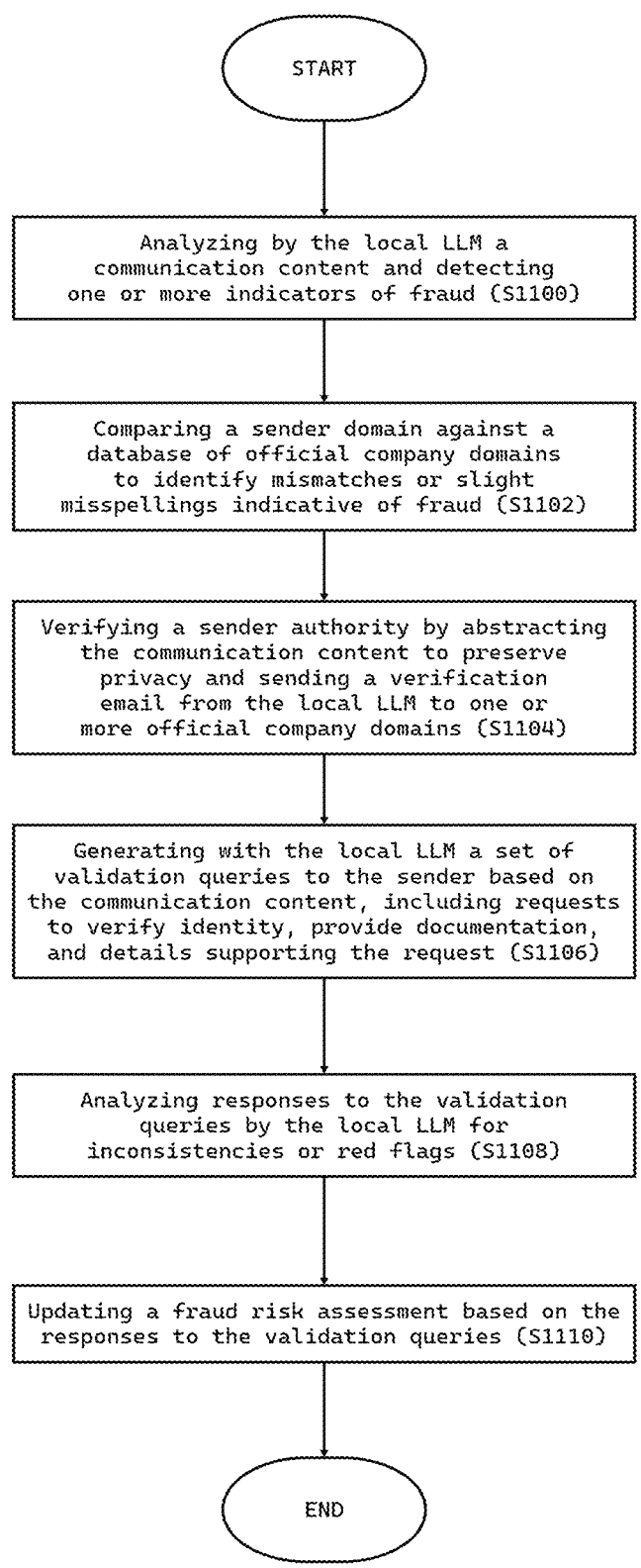
Figure 11:
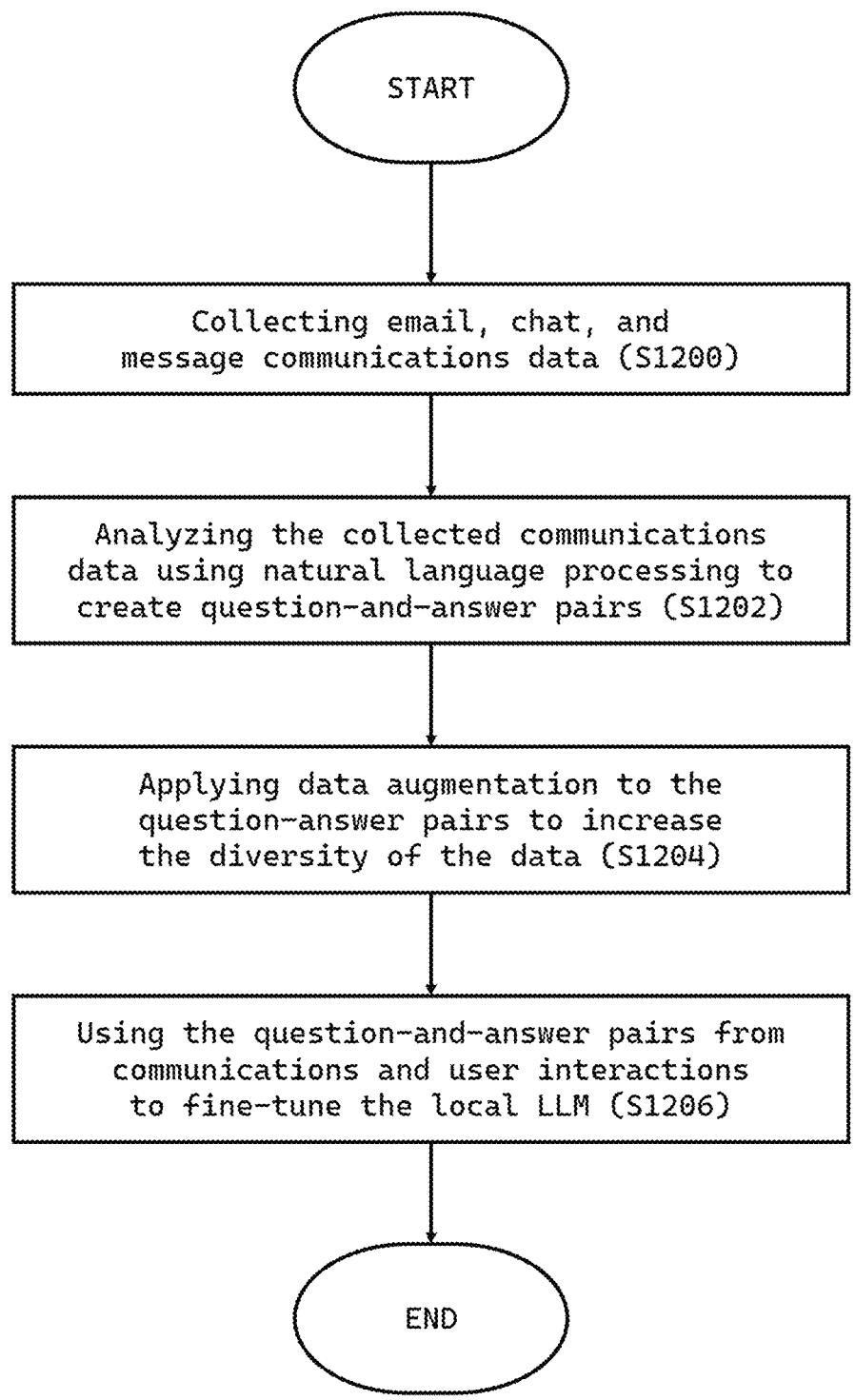
Figure 12:
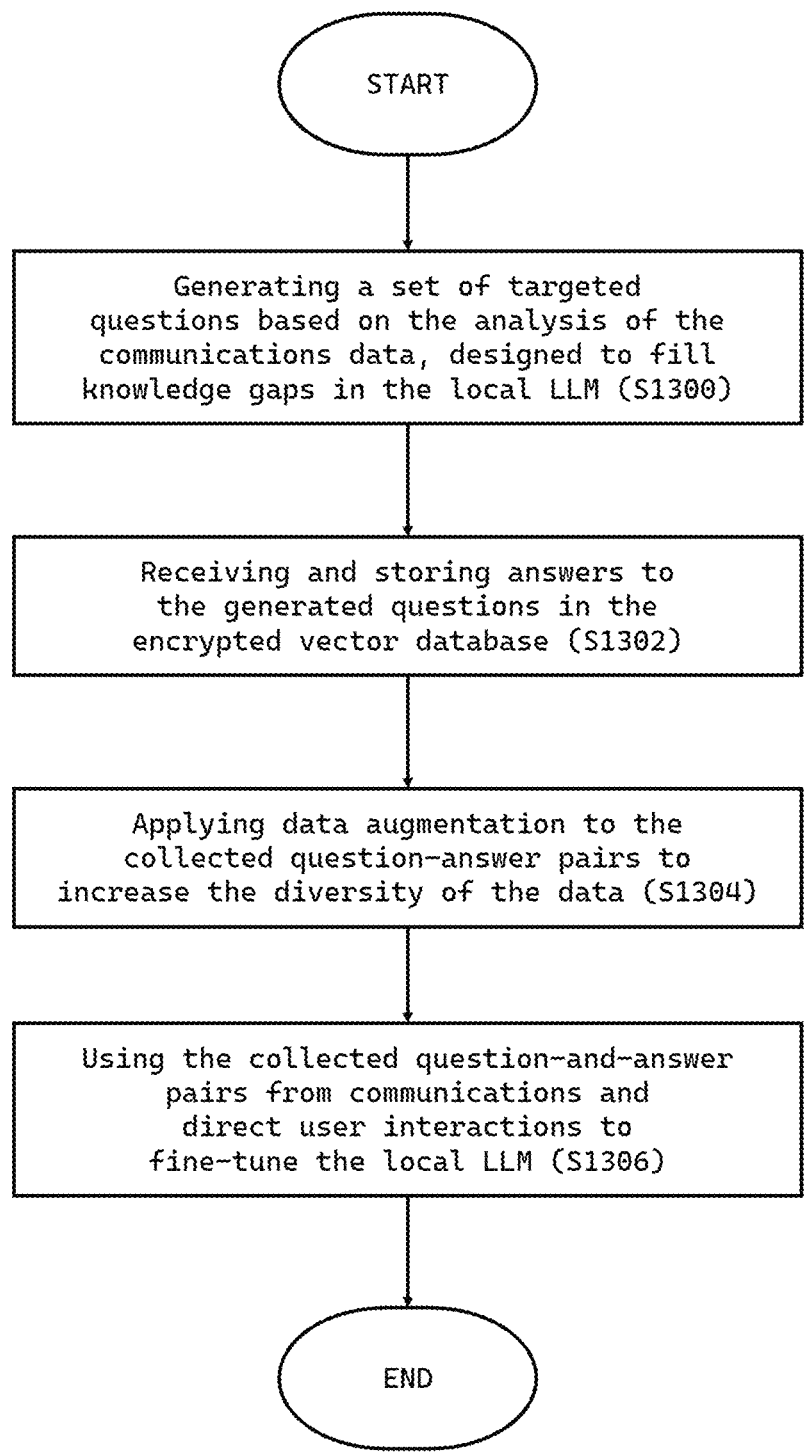
Figure 13:
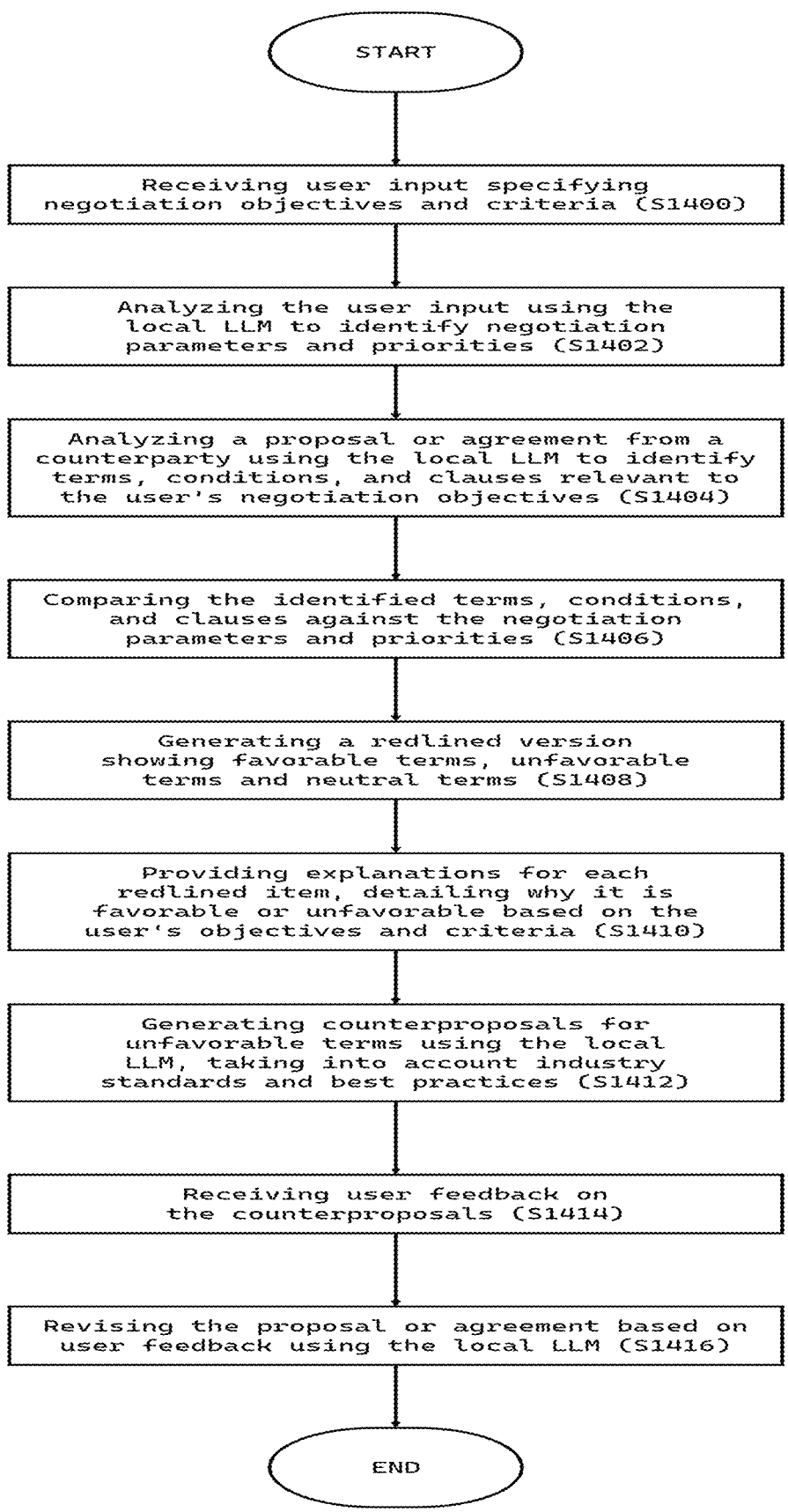
Figure 14:
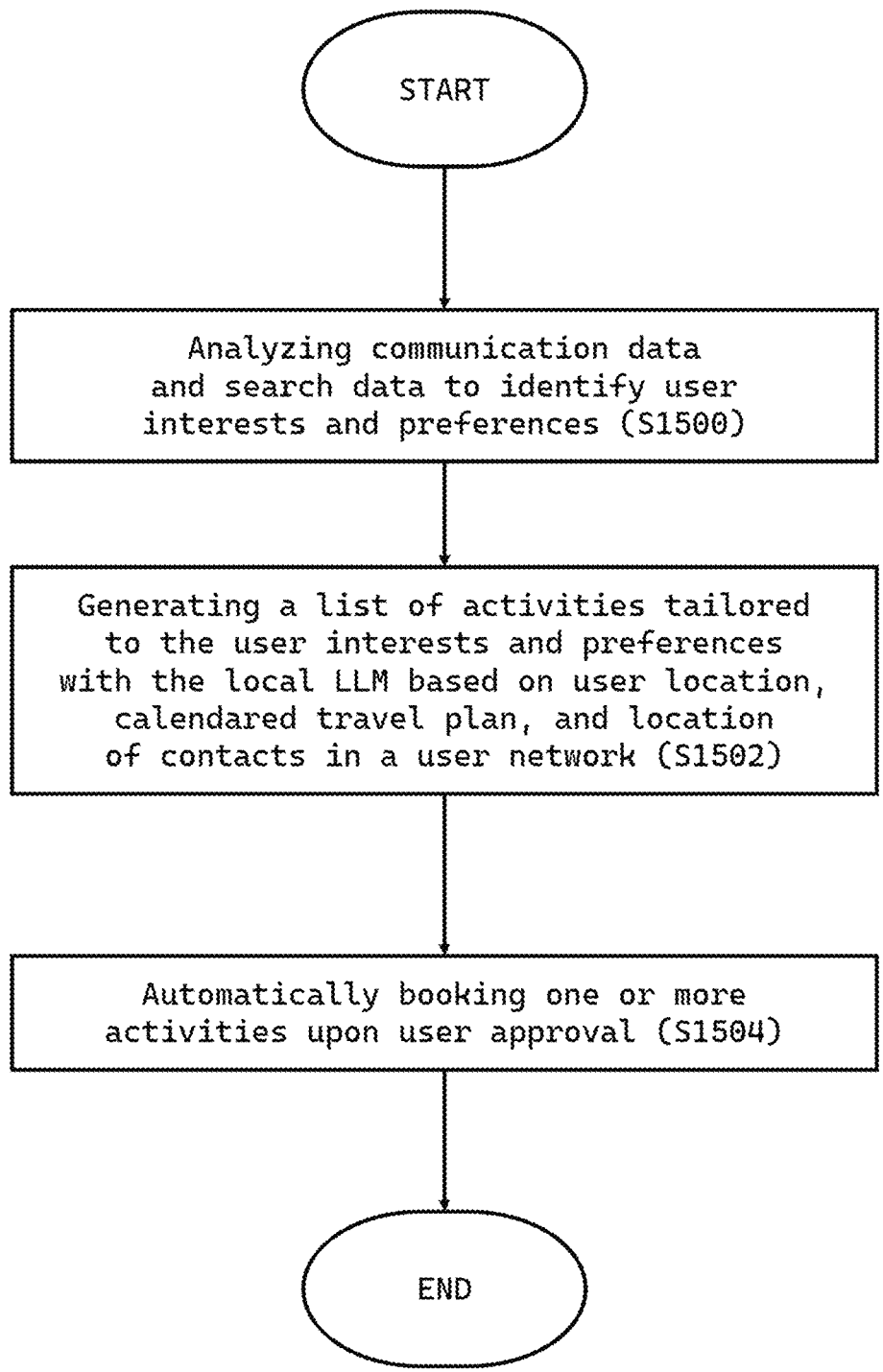
Figure 15:
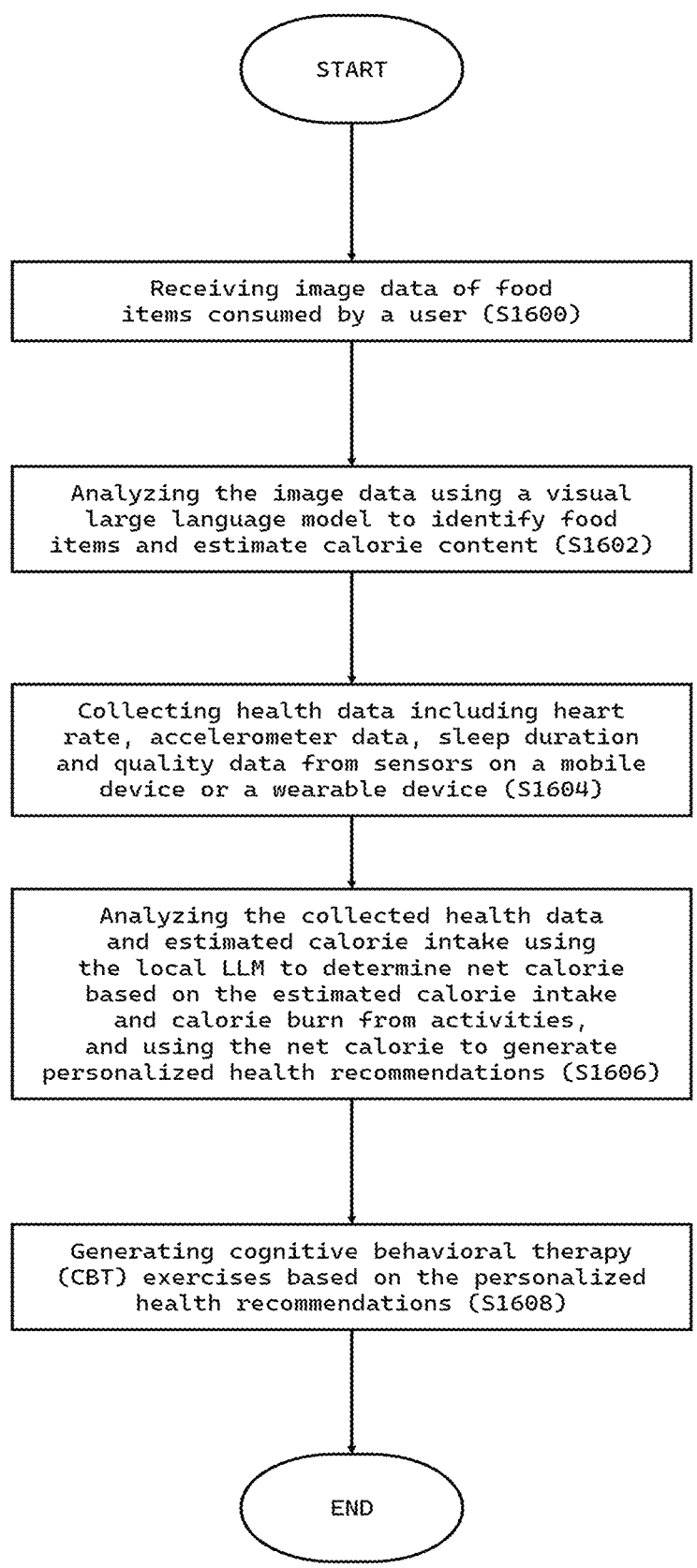

One mobile LLM embodiment is based on the LLaMa architecture which is an auto-regressive language model based on the transformer. As shown in FIG. 2, LLAMA uses pre-normalization, a technique borrowed from GPT-3. In this approach, the input to each transformer sub-layer is normalized using RMSNorm (Root Mean Square Normalization) instead of normalizing the output. This is done before the self-attention and feed-forward layers. Pre-normalization helps improve training stability, especially for deeper models, by preventing layer outputs from growing too large or small during training. LLaMA replaces the traditional ReLU (Rectified Linear Unit) activation function with the SwiGLU activation function, which was introduced in the PALM model. SwiGLU is a variant of the GLU (Gated Linear Unit) activation function. It typically leads to better performance and faster convergence during training. The SwiGLU function allows the model to learn more complex non-linear relationships in the data. LLaMA adopts Rotary Positional Embeddings (RoPE), a technique first used in GPT-NeoX. RoPE replaces the absolute positional embeddings used in the original transformer architecture. Instead of adding positional information at the input level, rotary embeddings are applied at each layer of the network. This approach allows the model to better generalize to sequence lengths not seen during training and provides a more flexible way of encoding positional information. Thus, the pre-normalization improves training stability and allows for training deeper models. The SwiGLU activation function enhances the model's ability to learn complex patterns. Rotary embeddings provide a more robust way of handling positional information, especially for longer sequences.

Mobile LLMs have model sizes ranging from 100 million to 1-2 billion parameters. This reduction in size is necessary to fit within mobile memory and compute constraints. Considerations for mobile LLM architectures include Depth vs width tradeoffs: Balancing the number of layers vs the dimensionality of hidden states. The attention mechanism uses efficient variants of self-attention like linear attention. The activation functions uses compute-efficient activations like SiLU/Swish. Techniques like factorized embeddings to reduce parameter count.

Leveraging sparsity in model architecture is used to reduce computation and memory requirements. The LLM uses Pruning: Removing unimportant weights and neurons; Structured sparsity: Enforcing block-sparse patterns in weight matrices; and Dynamic sparsity: Activating only a subset of the network conditioned on the input. Designing the model architecture with quantization includes: Using integer-friendly activation functions; Avoiding operations that are difficult to quantize; and Incorporating fake quantization nodes during training.

The mobile LLM designs use modular architectures that can adapt to different resource constraints: Switchable feed-forward networks of different sizes; Adaptive computation time to vary inference compute; Conditional computation to selectively activate model components.

Several techniques are used to accelerate and improve pre-training of mobile LLMs: Progressive training: Start with a small model and gradually increase size; Curriculum learning: Present easier examples before harder ones; Mixed precision training: Use lower precision formats to reduce memory and speed up training; Gradient accumulation: Simulate larger batch sizes on limited hardware; or Distributed training: Scale out training across multiple GPUs/TPUs. Knowledge distillation can be used for training compact mobile LLMs: Use a large teacher model to generate soft labels; Train the smaller student model to match the teacher's outputs; Can be applied during pre-training and fine-tuning stages. Leveraging multiple tasks and transferring knowledge can improve sample efficiency: Multi-task pre-training on diverse NLP tasks; Fine-tuning on downstream tasks with shared parameters; Meta-learning approaches to learn initialization for fast adaptation.

When adapting mobile LLMs to specific tasks, efficient fine-tuning can be used: Low-rank adaptation (LoRA) to tune a small number of parameters; Prefix-tuning to prepend learned task-specific vectors; Adapter modules inserted between transformer layers Pruning removes redundant weights to reduce model size such as: Magnitude-based pruning of individual weights; Structured pruning of entire neurons or filters; Iterative pruning and retraining for best results; or Importance-based pruning using second-order information.

Quantization reduces the precision of weights and activations by using Post-training quantization to 8-bit integers; Quantization-aware training for int8 or lower precision; Mixed-precision quantization targeting different bit-widths; and Vector quantization to compress embedding tables Knowledge distillation can be utilized for model compression in addition to training. This approach involves layer-wise distillation to compress individual components, attention distillation to transfer fine-grained knowledge, and data-free distillation when the original training data is unavailable. Layer-wise distillation compresses individual components of the model by training a student model to replicate the outputs of each layer of a larger teacher model. This method ensures that the student model captures the hierarchical knowledge embedded in the teacher model's layers. Additionally, attention distillation is used to transfer fine-grained knowledge from the teacher model to the student model. This involves training the student model to mimic the attention patterns of the teacher model, thereby preserving the intricate relationships between different parts of the input data. In scenarios where the original training data is unavailable, data-free distillation techniques are employed. These methods generate synthetic data or use alternative strategies to distill knowledge from the teacher model without relying on the original dataset.

Another technique for reducing parameters is low-rank factorization, which decomposes weight matrices into low-rank factors. This can be achieved through SVD-based factorization of weight matrices, low-rank adaptation of pre-trained models, and tensor decomposition methods like CP decomposition. Additionally, federated and collaborative learning techniques can leverage distributed data across devices and organizations. This includes cross-device federated learning, secure multi-party computation, decentralized and peer-to-peer learning, and collaborative fine-tuning across organizations. These approaches enable model improvement while maintaining data privacy and leveraging diverse datasets.

The above techniques are used to create TinyLLM which is a specialized LLM designed to run on resource-constrained 8/16-bit microcontrollers. The model architecture and training process are optimized for efficiency while still maintaining useful language understanding and generation abilities. One embodiment uses 4 transformer layers, with a 128 hidden dimension size, 512 intermediate FFN size, 4 attention heads, and a 5,000 token vocabulary. This compact architecture allows the entire model to fit within 128 KB of memory. The major software modules include a tokenizer, embedding layer, transformer layers, output layer, inference engine, and utility functions. The training process involves several specialized techniques, including careful data preparation, quantization-aware training, knowledge distillation, sparse training, mixed precision training, progressive training, and efficient optimization. The inference module is highly optimized for 8-bit microcontrollers, with careful memory management, sparse computation, quantized operations, attention optimization, caching and prefetching, and vectorization. This embodiment uses a compact transformer architecture with several key optimizations: reduced model size of only 1 million parameters, 8-bit quantization for all weights and activations, sparse attention to reduce computation, a single shared feed-forward network across all transformer layers, and factorized embeddings to reduce parameters.

TinyLLM includes a tokenizer implementing byte-pair encoding with a 5,000 token vocabulary optimized for 8-bit lookup tables; an embedding layer that maps input tokens to 128-dimensional embeddings using factorized embeddings and learned positional encodings; 4 identical transformer layers each containing multi-head attention, layer normalization, and a shared feed-forward network; an output layer that projects hidden states to vocabulary logits and applies softmax; an inference engine that manages model execution and memory, implements efficient sparse matrix operations, and handles input/output and text generation; and utility functions for 8-bit arithmetic, memory management, and I/O interfacing. Training TinyLLM involves the following: curating a compact, high-quality training corpus focused on domain-specific data for smart phone AI assistant functions as detailed below; quantization-aware training using simulated 8-bit quantization; knowledge distillation from a larger teacher model; sparse training to encourage sparsity; mixed precision training starting with higher precision and gradually reducing to 8-bit; progressive training starting with a very small model and gradually increasing size; and efficient optimization using specialized optimizers, gradient accumulation, and learning rate scheduling. The inference module is highly optimized for 8-bit microcontrollers, with careful memory management, sparse computation exploiting model sparsity, quantized 8-bit integer operations, attention optimizations like linear approximation and pruning, caching and prefetching of weights and activations, and vectorization leveraging SIMD instructions if available.

TinyLLM provides natural language interfaces for IoT devices, voice assistants for appliances, context-aware automation, natural language monitoring and alerting for industrial systems, on-device NLP for wearables, natural language command interpretation for robotics, and adding NLP capabilities to existing embedded systems. Architectural innovations like sparse and quantization-aware designs enable compact yet capable models. Efficient training techniques including distillation and multi-task learning improve sample efficiency. Aggressive compression via pruning, quantization, and low-rank factorization reduces resource requirements. Dedicated neural hardware with sparse and low-precision support enables fast, energy-efficient inference. System-level optimizations across the stack maximize performance within mobile constraints.

Tiny LLM can be seamlessly integrated with vector databases to automate a wide range of secretarial tasks, creating a powerful synergy between contextual understanding and efficient information retrieval. This integration enables sophisticated document management, where document embeddings stored in vector databases can be quickly accessed and summarized by LLMs based on user queries. In email management, the system can classify, prioritize, and generate responses to incoming emails by leveraging similar past communications retrieved via vector search. Calendar scheduling becomes more intelligent, with LLMs interpreting scheduling requests and finding optimal meeting times by querying the vector database for conflicts. Information lookup and research tasks are streamlined, as LLMs can interpret questions, generate relevant queries, and synthesize answers from information retrieved through vector similarity search. Task management is enhanced by storing task descriptions as vectors, allowing LLMs to generate and manage task lists with context from similar past tasks. Meeting support is bolstered by converting transcripts and notes to vector embeddings, enabling LLMs to generate summaries, action items, and follow-ups with reference to relevant past meetings. This integration offers key benefits such as efficient retrieval of relevant information, contextual understanding and generation, the ability to learn from past data and actions, and scalable handling of large amounts of unstructured data.

TinyLLM with appropriate safeguards and human oversight can automate a wide range of tasks, freeing up humans to focus on more complex and creative work. For instance, LLMs can excel in calendar management and scheduling by analyzing emails and messages to identify meeting requests, suggesting optimal meeting times based on participants' availability, sending meeting invites and reminders, rescheduling or canceling meetings as needed.

In one embodiment, the LLama LLM is a neural network-based model designed to process voice commands, text inputs, and generate responses tailored to mobile devices. Its primary goal is to enable seamless interactions between users and their phones. One exemplary architecture of the Llama LLM is as follows:

1. Input Layer: The input layer receives audio or text data from the user's phone.
2. Audio Preprocessing Module (APM): APM processes raw audio signals, applying: Noise reduction, Echo cancellation, Spectral analysis
3. Text Input Processing Module (TIPM): For text-based inputs, TIPM performs tasks such as: Tokenization, Part-of-speech taggingNamed entity recognition
4. Contextual Understanding Module (CUM): CUM analyzes the input data to understand its context, including: Previous interactions with the phone or app, User preferences and habits
5. Inference Engine: The inference engine combines the output from APM/TIPM/CUM to generate a response.
6. Response Generation Module (RGM): RGM uses the inferred context to generate an appropriate response, such as: Text-based responses for messaging apps or search queries, Voice prompts for voice assistants or navigation systems Neural Network Components:
1. Convolutional Neural Networks (CNNs): Used in APM and TIPM for audio/text feature extraction.
2. Recurrent Neural Networks (RNNs): Employed in CUM to analyze sequential data, such as user interactions or text sequences.
3. Transformers: Utilized in RGM for attention-based processing of contextual information.

Training:
1. Large-scale Datasets: The model is trained on massive datasets containing diverse audio/text inputs and corresponding responses.
2. Multi-task Learning: The LLM learns multiple tasks, such as: Voice command recognition, Text input understanding, Contextual response generation
3. Supervised Instruction Fine-Tuning: The fine-tuning process involves supervised instruction, where the model is trained on the collected phone data/conversations to improve its ability to generate coherent and contextually appropriate responses. For more personalization, the LLM probes the user with a series of Questions & Answers directed at the user. This method ensures that the model learns from high-quality examples of human interaction.

Inference:
1. Real-time Processing: The model processes user inputs in real-time to generate immediate responses.
2. Context-aware Inference: The LLM uses contextual information from previous interactions and user preferences to adapt its responses.

By leveraging this architecture, LLama's LLM for phone inferencing operations can provide accurate and personalized responses to users' voice commands and text-based queries. The primary dataset used for fine-tuning LLM consists of approximately 125,000 conversations sourced from ShareGPT. These conversations provide a rich set of real-world interactions that help the model learn to handle a variety of conversational contexts and nuances. LLM is fine-tuned from the LLAMA model, which serves as the foundational architecture. The fine-tuning process involves supervised instruction, where the model is trained on the collected conversations to improve its ability to generate coherent and contextually appropriate responses. This method ensures that the model learns from high-quality examples of human interactions. The fine-tuned LLM model is evaluated using a combination of standard benchmarks, human preference assessments, and LLM-as-a-judge evaluations. For instance, GPT-4 is used to rate the quality of responses generated by Vicuna, comparing them to those from other models like ChatGPT and Google Bard. This evaluation framework helps in quantifying the improvements in the model's performance. Techniques such as mixed-precision training (FP16) and optimizer CPU offloading are employed to manage memory usage efficiently. For example, the model parameters and optimizer states are distributed across multiple nodes using the ZeRO stage-3 strategy, which partitions the model, gradients, and optimizer states to reduce GPU memory usage. Tools like PyTorch Lightning and DeepSpeed are used to streamline the fine-tuning process. These frameworks provide interfaces to configure and manage the training process, allowing for efficient scaling across multiple nodes and optimizing the use of computational resources. The fine-tuning of Vicuna using ShareGPT data involves a combination of high-quality conversational datasets, supervised instruction fine-tuning, and advanced technical optimizations to enhance the model's performance and efficiency.

While the mobile LLM model is compact to improve processor performance, its output can come close to the trillion parameter LLMs. To identify gaps in the knowledge of a large language model (LLM), several strategies can be employed. These strategies involve analyzing the model's performance, understanding its limitations, and systematically testing its capabilities and improving performance. One approach is performance analysis, which includes benchmarking and error analysis. Benchmarking involves using standardized datasets and domain-specific benchmarks to evaluate the LLM's performance across various tasks and specialized areas. By comparing the results with other models, one can identify relative strengths and weaknesses. Error analysis involves categorizing the types of errors the LLM makes, such as factual inaccuracies, logical inconsistencies, or language fluency issues, and determining the frequency of these errors to pinpoint common problem areas. User feedback is another crucial strategy. Direct feedback can be collected through surveys and questionnaires, asking users specific questions about the model's performance and areas where it falls short. Additionally, user reports can be encouraged to highlight instances where the LLM provides incorrect or unsatisfactory responses. Implicit feedback can be gathered by analyzing interaction logs to identify patterns where users frequently correct or ignore the model's outputs and monitoring usage patterns to detect underutilized features, which may indicate unmet user needs. Systematic testing involves knowledge probing and coverage analysis. Probing questions are designed to cover a wide range of topics and knowledge areas, evaluating the LLM's responses to identify gaps. Adversarial testing uses challenging examples to test the LLM's understanding and robustness. Coverage analysis involves creating a comprehensive list of relevant topics and testing the model's knowledge on each to identify areas with insufficient coverage. Additionally, key concepts within each topic are tested to uncover conceptual gaps in the model's understanding. Cross-referencing with external knowledge bases and human expertise is also essential. Comparing the LLM's responses with authoritative external knowledge bases and using automated fact-checking tools can highlight discrepancies and gaps. Expert review by subject matter experts can provide insights into specific knowledge gaps, while crowdsourcing platforms can gather diverse perspectives on the LLM's performance. Continuous learning and improvement are vital for addressing identified gaps. Implementing a feedback loop where gaps are used to retrain and fine-tune the LLM ensures continuous updates with new data and corrections. Active learning techniques can prioritize training on examples where the LLM is uncertain or frequently makes errors. Incorporating new data sources and information regularly, as well as fine-tuning the LLM on domain-specific datasets, can improve its knowledge and performance in specialized areas.

In one example, to improve performance and to enhance the model's capabilities and domain-specific knowledge as a personal assistant, the LLM gains knowledge through using phone data (original communications and subsequent responses to email, chat, message) and question-answer sessions with the phone user.

To turn email threads into a structured Q&A format, start by analyzing the email thread to identify distinct questions and their corresponding answers. The system determines inquiries from one party and the responses from another. Once identified, it extracts the relevant questions and answers from the email thread. Next, organize the extracted content into a clear Q&A format. The system ensures that any sensitive or personal information is removed or anonymized before sharing the Q&A more widely. Finally, establish a process for regularly reviewing and updating the Q&A document with new information from ongoing email communications. By following these steps, you can effectively transform email threads into a structured Q&A format, making the information more accessible and easier to reference. This can be particularly useful for creating FAQs, knowledge bases, or training materials within an organization.

Integrating question and answer (Q&A) interactions from email and chat can significantly enhance the knowledge of a large language model (LLM). These interactions provide a continuous stream of real-world data, reflecting diverse user information needs and language usage. By analyzing this data, the LLM can learn from a wide range of topics and contexts, improving its ability to generate relevant responses. When users correct the LLM's responses or provide additional context in follow-up questions, these interactions serve as valuable feedback, helping the LLM identify and rectify inaccuracies, leading to more accurate outputs over time.

Email and chat interactions often contain rich contextual information, allowing the LLM to improve its understanding of context, track conversation threads, and maintain coherence in its responses. By examining how users phrase their questions and the types of follow-up questions they ask, the LLM can refine its ability to interpret and respond to user queries more effectively. These interactions cover a broad spectrum of topics, enabling the LLM to expand its knowledge base across various domains and gain deeper insights into specialized fields.

Furthermore, Q&A interactions help the LLM build user profiles based on individual preferences, interests, and knowledge levels, enabling more personalized responses. The LLM can adapt its responses based on feedback and patterns observed in these interactions, adjusting its explanations to be more detailed and clear when necessary. By analyzing the questions users ask and identifying areas where responses are lacking, the LLM can pinpoint knowledge gaps and address them through targeted training and updates. Monitoring trends in Q&A interactions also reveals emerging topics and areas of interest, ensuring the LLM remains current and relevant. The following operations can be done:

Expert-Driven Fine-Tuning: Users can engage in Q&A sessions with the LLM, providing high-quality, domain-specific information. This interaction can be used to fine-tune the model, allowing it to learn from the experts' knowledge and reasoning processes.

Targeted Knowledge Acquisition: By focusing on specific domains or topics, experts can help fill knowledge gaps in the LLM. This targeted approach ensures that the model gains accurate and up-to-date information in areas where it may be lacking.

Contextual Learning: Users can provide not just answers, but also explanations and context. This helps the LLM understand the reasoning behind the answers, improving its ability to generalize and apply knowledge in different scenarios.

Iterative Improvement: Regular Q&A sessions can be part of an ongoing improvement process. As the model improves, experts can focus on more complex or nuanced topics, gradually expanding the LLM's capabilities.

Multi-Domain Expertise: By involving experts from various fields, the LLM can develop a broad knowledge base across multiple domains, enhancing its versatility and applicability.

Real-World Problem Solving: Experts can present real-world problems and scenarios, helping the LLM learn practical application of knowledge rather than just theoretical concepts.

Bias Reduction: Expert input can help identify and correct biases in the model's responses, ensuring more balanced and accurate outputs.

Continuous Learning: This approach allows for continuous learning, keeping the LLM updated with the latest developments in various fields.

Feedback Loop: Experts can provide feedback on the LLM's responses, helping to refine its accuracy and relevance over time.

Specialized Versions: This process can lead to the development of specialized versions of the LLM for specific industries or applications.

By leveraging expert knowledge through Q&A sessions, LLMs can significantly enhance their accuracy, depth of understanding, and practical applicability across various domains.

In the realm of email management, LLMs can prioritize and categorize incoming emails, draft responses to routine inquiries, flag important messages for human review, organize emails into appropriate folders, and even generate first drafts of routine documents like reports or memos. They can also assist with document preparation by formatting documents according to specified templates, proofreading and suggesting edits for grammar and style, generating presentation slides based on provided content, and creating detailed itineraries.

Travel planning is another area where LLMs can shine, researching flight and hotel options based on preferences, making reservations for transportation and accommodations, providing relevant travel information (e.g. weather, local customs), and even generating detailed itineraries. Data entry and management tasks are also within their capabilities, including extracting relevant information from documents and entering into databases, updating contact lists and customer relationship management (CRM) systems, and generating reports from data sets.

Communications Assistance

In terms of phone and message handling, LLMs can transcribe voicemails and summarize key points, draft responses to text messages or chat inquiries, prioritize and route messages to appropriate team members. They can also assist with research and information gathering by conducting online research on specified topics, summarizing key findings from multiple sources, compiling relevant statistics or data points.

In the realm of meeting support, LLMs can generate meeting agendas based on discussion topics, take and summarize meeting notes, create action item lists and follow up on task completion. Finally, they can handle basic financial tasks such as categorizing expenses for accounting purposes, generating invoices based on predefined templates, sending payment reminders for overdue accounts.

In the realm of social media management, LLMs can draft social media posts based on provided guidelines, schedule posts for optimal times, monitor mentions and flag items needing human response.

In one embodiment, tasks can be extracted from various forms of digital communication such as emails, chats, and text messages by leveraging natural language processing (NLP) techniques and machine learning algorithms. For instance, when analyzing an email, the system can identify specific keywords or phrases that indicate a task needs to be performed, such as "book flight" or "pay bill". Similarly, in chat conversations, the system can recognize patterns of language that suggest a particular action is required, like "can you send me the file?" or "remind me about my appointment tomorrow".

In text messages, the system can look for specific phrases or abbreviations that indicate a task needs to be performed, such as "pick up milk" or "meet at 2 pm". By analyzing these digital communications and identifying relevant keywords, phrases, and patterns of language, the system can extract tasks that need to be completed. This information can then be used to automate task completion, provide reminders, or offer suggestions for completing a particular task.

To further refine this process, machine learning algorithms can be trained on large datasets of emails, chats, and text messages to recognize specific linguistic patterns and contextual cues that indicate the presence of a task. For example, if an email contains multiple instances of "urgent" or "deadline", it may suggest that a time-sensitive task needs to be completed. By combining NLP techniques with machine learning algorithms, digital communication platforms can effectively extract tasks from emails, chats, and text messages, enabling users to stay organized and focused on their goals.

AI Phone Assistant Application

A phone's personal assistant LLM can play a significant role in helping users navigate their daily lives by leveraging various data sources such as:

1. Location: By tracking the user's location through GPS or Wi-Fi signals, the assistant can provide personalized recommendations for nearby places of interest, traffic updates, and even suggest alternative routes to avoid congestion.

2. Calendar: The assistant can access the user's calendar events and appointments, allowing it to:
  Remind users about upcoming meetings and deadlines
  Provide travel directions to destinations based on scheduled appointments
  Offer suggestions for nearby restaurants or coffee shops during breaks between meetings 3. Email/Chat/Messages: By integrating with popular email clients, chat apps, and messaging platforms, the assistant can:
  Read out loud important emails or messages that require attention
  Provide summaries of lengthy conversations to help users stay on top of discussions
  Offer suggestions for responses based on the context of a conversation To apply predictions to daily life constraints and avoid missing important deadlines, the personal assistant can:

1. Predictive scheduling: Based on the user's calendar events and location data, the assistant can predict potential conflicts or schedule overlaps, allowing users to adjust their plans accordingly.

2. Task prioritization: By analyzing email threads, chat logs, and message conversations, the assistant can identify high-priority tasks that require attention and provide suggestions for completing them efficiently.

3. Time management optimization: The assistant can analyze the user's daily routine and suggest adjustments to optimize time usage, such as:
  Suggesting shorter breaks between meetings
  Recommending earlier start times or later finish times based on traffic conditions 4. Proactive reminders: By analyzing the user's calendar events and deadlines, the assistant can proactively remind users about upcoming tasks and appointments, ensuring they stay on track.

5. Contextual suggestions: The assistant can provide contextual suggestions for daily activities, such as:
  Suggesting nearby restaurants or coffee shops based on a meeting location
  Offering travel tips and recommendations based on traffic conditions Some examples of how the personal assistant might assist users include:
  "You have an appointment at 2 PM. I've checked traffic and suggest leaving by 1:30 to avoid congestion."
  "I see you're running low on time for your project deadline. Let me help you prioritize tasks and provide a suggested schedule to meet the deadline."
  "Your boss sent you an email about a meeting change. I'll summarize it for you, and we can discuss potential adjustments to your daily routine."

By leveraging these data sources and applying predictions to daily life constraints, a phone's personal assistant can significantly improve users' productivity, reduce stress, and help them navigate their busy lives more efficiently.

One exemplary pseudocode for extracting tasks from emails, chats, and text communications is as follows:

Email Task Extraction

1. Pre-Processing
  Tokenize the email content into individual words or phrases (tokens)
  Remove stop words (common words like "the", "and", etc.) to reduce noise
  Convert all tokens to lowercase for consistency 2. Task Identification
  Use a machine learning model trained on labeled data to identify potential tasks in the email
  Train the model using techniques such as:
    Named Entity Recognition (NER) to extract relevant entities like dates, times, and locations
    Part-of-Speech (POS) tagging to analyze word context and meaning
    Dependency parsing to understand sentence structure and relationships between words 3. Task Extraction
  Use the trained model to identify specific tasks mentioned in the email
  Extract relevant information such as:
    Task name or description
    Due date or deadline
    Priority level (high, medium, low)

4. Post-Processing
  Remove any extracted tasks that are not actionable or do not meet a certain threshold of relevance Chat Task Extraction 1. Pre-Processing
  Tokenize the chat conversation into individual messages or utterances
  Remove stop words and convert all tokens to lowercase for consistency 2. Task Identification
  Use a machine learning model trained on labeled data to identify potential tasks in the chat conversation
  Train the model using techniques such as:
    Intent detection to determine user intent (e.g., booking, inquiry)
    Entity recognition to extract relevant entities like dates, times, and locations 3. Task Extraction
  Use the trained model to identify specific tasks mentioned in the chat conversation
  Extract relevant information such as:
    Task name or description
    Due date or deadline
    Priority level (high, medium, low)

4. Post-Processing
  Remove any extracted tasks that are not actionable or do not meet a certain threshold of relevance Text Message Task Extraction 1. Pre-Processing
  Tokenize the text message into individual words or phrases (tokens)
  Remove stop words and convert all tokens to lowercase for consistency 2. Task Identification
   Use a machine learning model trained on labeled data to identify potential tasks in the text message
   Train the model using techniques such as:
      Intent detection to determine user intent (e.g., booking, inquiry)
      Entity recognition to extract relevant entities like dates, times, and locations
3. Task Extraction
   Use the trained model to identify specific tasks mentioned in the text message
   Extract relevant information such as:
      Task name or description
      Due date or deadline
      Priority level (high, medium, low)
4. Post-Processing
   Remove any extracted tasks that are not actionable or do not meet a certain threshold of relevance
Common Steps
   1. Task Prioritization: Use machine learning algorithms to prioritize the extracted tasks based on factors such as:
      Urgency
      Importance
      Deadline
   2. Task Categorization: Group similar tasks together into categories (e.g., work, personal, errands)
   3. Task Assignment: Assign each task a unique identifier and associate it with relevant metadata (e.g., due date, priority level)
Example Pseudocode

```
function extractTasks(emails) {
  // Pre-processing
  emails = tokenizeEmails(emails);
  emails = removeStopWords(emails);
  // Task Identification
  tasks = [ ];
  for each email in emails {
    task = identifyTask(email);
    if (task != null) {
      tasks.add(task);
    }
  }
  // Post-processing
  tasks = filterTasks(tasks, relevanceThreshold);
  return tasks;
}
function extractTasks(chats) {
  // Pre-processing
  chats = tokenizeChats(chats);
  chats = removeStopWords(chats);
  // Task Identification
  tasks = [ ];
  for each chat in chats {
    task = identifyTask(chat);
    if (task != null) {
      tasks.add(task);
    }
  }
  // Post-processing
  tasks = filterTasks(tasks, relevanceThreshold);
  return tasks;
}
function extractTasks(textMessages) {
  // Pre-processing
  textMessages = tokenizeTextMessages(textMessages);
  textMessages = removeStopWords(textMessages);
  // Task Identification
  tasks = [ ];
  for each textMessage in textMessages {
    task = identifyTask(textMessage);
    if (task != null) {
      tasks.add(task);
    }
  }
  // Post-processing
  tasks = filterTasks(tasks, relevanceThreshold);
  return tasks;
}
```

Once tasks are identified, Large Language Models (LLMs) can anonymize research by following these steps:
Anonymization
   1. Tokenization: Break down the task description into individual tokens or words.
   2. Stopword removal: Remove common stopwords like "the", "and", etc., to reduce noise and focus on relevant information.
   3. Named Entity Recognition (NER): Identify specific entities mentioned in the task, such as names, locations, dates, times, and organizations.
Research
   1. Knowledge graph traversal: Traverse a knowledge graph or database of related concepts, entities, and relationships to gather more information about the task.
   2. Contextualized search: Perform searches on relevant databases, APIs, or web pages using contextualized queries that incorporate the anonymized tokens and NER results.
   3. Information retrieval: Retrieve relevant documents, articles, or research papers from various sources.
Solution Generation
   1. Text summarization: Summarize retrieved information into a concise text summary highlighting key points and potential solutions.
   2. Entity-based reasoning: Use entity recognition to identify specific entities mentioned in the task and generate solution suggestions based on their relationships with other entities.
   3. Inference generation: Generate inferred solutions by combining relevant concepts, rules, or patterns learned from training data.
Anonymized Solution Proposals
   1. Solution ranking: Rank proposed solutions based on relevance, feasibility, and potential impact.
   2. Anonymous solution presentation: Present the top-ranked solutions to the user Example Task: "Book a flight from New York to Los Angeles for next Friday"
Anonymized Research:
   Tokenization: ["book", "flight", "New York", "Los Angeles", "Friday"]
   NER: Identifies entities like "New York" (location), "Los Angeles" (location), and "next Friday" (date)
Research:
   Knowledge graph traversal: Retrieves information about flight schedules, airlines, airports, and travel agencies.
   Contextualized search: Searches for flights from New York to Los Angeles on next Friday using APIs or web pages.
Solution Generation:
   Text summarization: Summarizes retrieved information into a concise text summary highlighting key points like available flights, prices, and travel times.
   Entity-based reasoning: Identifies specific entities mentioned in the task (e.g., "New York" and "Los Angeles") and generates solution suggestions based on their relationships with other entities (e.g., flight schedules).

Inference generation: Generates inferred solutions by combining relevant concepts like airline routes, airport information, and travel times.

Anonymized Solution Proposals:

1. Book a flight from New York to Los Angeles on next Friday using [Airline X] for $500.
2. Consider flying out of LaGuardia Airport (LGA) instead of John F. Kennedy International Airport (JFK) for better prices.
3. Look into alternative travel dates or consider taking the train for more affordable options.

These anonymized solution proposals are presented to the user without revealing any information about our research process or sources, ensuring a seamless and private experience.

Health Assistance

The local LLMs leverage their ability to process vast amounts of text-based data, including electronic health records (EHRs), medical research papers, and clinical trials, to analyze historical health data. By analyzing this data, the app can identify patterns and correlations that may indicate an increased risk of developing conditions such as hypertension, diabetes, or Alzheimer's disease.

For instance, by examining EHRs from patients with a history of high blood pressure, the app might discover that certain medications, lifestyle factors (e.g., physical activity levels), or demographic characteristics (e.g., age, gender) are associated with an increased risk of developing hypertension. Similarly, analyzing data on individuals diagnosed with diabetes may reveal correlations between specific medical conditions (e.g., obesity, sleep apnea), environmental factors (e.g., air pollution, noise exposure), and genetic predispositions. Armed with this knowledge, LLMs can draft Cognitive Behavioral Therapy (CBT) corrective measures to help patients mitigate their risk of developing these conditions. For example:

Hypertension: when the wearable device detects high blood pressure, a CBT program can suggest actions such as stress management techniques, such as mindfulness meditation or deep breathing exercises, to reduce blood pressure spikes caused by anxiety. Long term the CBT can suggest low salt and healthy food alternatives.

Diabetes: when the wearable device detects high or low glucose level, the CBT program could short term ask the user to eat something to offset low glucose, or do mild exercise to reduce high glucose, and long term can focus on promoting healthy eating habits and increasing physical activity levels through goal-setting strategies and self-monitoring techniques.

These corrective measures would be tailored to the individual patient's needs, taking into account their unique medical history, lifestyle factors, and demographic characteristics. By providing personalized guidance and support, LLMs can empower patients to make informed decisions about their health and take proactive steps towards reducing their risk of developing these conditions.

Furthermore, by analyzing historical data on individuals with Alzheimer's disease, the app might identify early warning signs or biomarkers that could indicate an increased risk of developing the condition. This information could be used to develop CBT-based interventions aimed at promoting cognitive reserve-building strategies (e.g., mental exercises, social engagement) and reducing modifiable risk factors (e.g., physical inactivity, sleep disturbances).

```
// Wearable Device Detects High Blood Pressure
if (bloodPressure > threshold) {
    // Start CBT Program
    startCBTProgram( );
    // Suggest Stress Management Techniques
    suggestStressManagementTechniques( );
}
function startCBTProgram( ) {
    // Initialize CBT Program Variables
    stressLevel = 0;
    anxietyScore = 0;
    // Set Goal: Reduce Blood Pressure Spikes Caused by Anxiety
    goal = "Reduce blood pressure spikes caused by anxiety";
}
function suggestStressManagementTechniques( ) {
    // Recommend Mindfulness Meditation or Deep Breathing Exercises
    recommendMindfulnessMeditation( );
    recommendDeepBreathingExercises( );
    // Provide Guided Sessions for Stress Management Techniques
    provideGuidedSessionsForStressManagement( );
}
// Long-term CBT Program Suggestions
function suggestHealthyFoodAlternatives( ) {
    // Recommend Low-Sodium Foods and Recipes
    recommendLowSodiumFoodsAndRecipes( );
    // Suggest Healthy Snacks and Meal Ideas
    suggestHealthySnacksAndMealIdeas( );
}
function suggestPhysicalActivityGoals( ) {
    // Set Goal: Increase Physical Activity Levels to Reduce Blood Pressure
    goal = "Increase physical activity levels to reduce blood pressure";
    // Recommend Activities for Stress Relief, such as Yoga or Walking
    recommendActivitiesForStressRelief( );
}
```

An example embodiment of a wearable or earable device that includes a local large language model (LLM) to monitor glucose and blood pressure conditions and run cognitive behavioral therapy (CBT) to dynamically help the user take care of herself can be described as follows:

The wearable device, such as a smartwatch or earable, is equipped with sensors to continuously monitor the user's glucose levels and blood pressure. More details on the glucose/BP device is detailed in U.S. application Ser. No. 17/731,013 filed Jan. 15, 2020, the content of which is incorporated by reference. The collected health data in the wearable device is securely stored in an encrypted vector database on the device. The local LLM processes this data to identify patterns indicative of medical conditions such as hypertension or diabetes.

Upon detecting a potential health issue, the LLM generates personalized CBT exercises tailored to the user's specific condition. These exercises are designed to help the user manage her health proactively. For instance, if the LLM detects elevated blood pressure, it might suggest relaxation techniques or breathing exercises. If it identifies irregular glucose levels, it could recommend dietary adjustments or physical activities.

The CBT exercises are presented to the user through the wearable device's interface, such as a screen on a smartwatch or audio prompts through an earable. The LLM tracks the user's adherence to the recommended exercises and adjusts the treatment plan based on the user's engagement and subsequent health data. This dynamic adjustment ensures that the CBT remains effective and relevant to the user's current health status.

Additionally, the LLM can integrate data from other sources, such as the user's calendar, emails, and messages, to provide a holistic approach to health management. For example, it can remind the user to take medication, schedule doctor's appointments, or suggest stress-relief activities based on the user's daily schedule and communication patterns.

The wearable device also includes security features to protect user privacy. All data processing occurs locally on the device, and any information sent to external servers is anonymized. If the device detects unauthorized access or is lost, it can automatically wipe all stored data to prevent breaches. This embodiment leverages the capabilities of a local LLM to provide continuous, personalized health management through a wearable device, enhancing the user's ability to take care of herself dynamically and securely.

In another embodiment, an earable device can be used. The earable device could be designed to capture and analyze various health metrics, leveraging its proximity to the user's head and ear canal. This smart earpiece could be equipped with multiple sensors to monitor a range of physiological data. The device measures blood pressure using pulse transit time analysis, for example. Continuous glucose monitoring through the ear can be done as taught in application Ser. No. 17/731,013. ECG (electrocardiogram) data could be captured, albeit with potentially less accuracy than chest-based sensors. EEG (electroencephalogram) monitoring is an emerging capability for earables, allowing for brain activity tracking through sensors placed in or around the ear. The ear canal provides a good location for sweat analysis, which could offer insights into electrolyte balance and hydration status. Bioimpedance measurements estimate body composition or hydration levels. While not commonly measured through earables, future developments might even allow for non-invasive lactic acid monitoring. This earable integrates with the local Large Language Model (LLM) system with CBT assistance as described above. The health data from these sensors would be securely collected and stored in an encrypted vector database on the device. The local LLM would analyze this data to identify patterns indicative of various medical conditions. Based on its analysis, the LLM could generate personalized cognitive behavioral therapy (CBT) exercises, which would be presented to the user through audio prompts. The system would continuously monitor the user's adherence to these exercises and adjust the treatment plan based on improvements detected in the user's condition. By combining this health data with other information like communication patterns and daily activities, the LLM could provide comprehensive health management recommendations. Importantly, all data processing would occur locally on the device, ensuring user privacy and data security.

A wearable device designed for mental health monitoring can incorporate several features to provide comprehensive and continuous support to the user. Equipped with various sensors, the wearable can capture bioimpedance, sweat data, lactic acid levels, EEG (electroencephalogram), ECG (electrocardiogram), blood pressure, and glucose information. These sensors allow the device to monitor a wide range of physiological parameters that are indicative of the user's mental and physical health. The wearable device can use bioimpedance sensors to measure body composition and hydration levels, while sweat sensors can analyze electrolyte balance and hydration status. Lactic acid sensors can provide insights into muscle fatigue and overall physical exertion. EEG sensors can monitor brain activity, offering valuable data on the user's mental state, including stress and anxiety levels. ECG sensors can track heart health, detecting irregularities that may be linked to mental health conditions. Blood pressure sensors can monitor hypertension, and glucose sensors can provide continuous glucose monitoring, which is crucial for users with diabetes. The data collected by these sensors is securely stored in an encrypted vector database on the device. A local large language model (LLM) processes this data to identify patterns indicative of mental health conditions such as anxiety, stress, or depression. The LLM can generate personalized cognitive behavioral therapy (CBT) exercises tailored to the user's specific needs. These exercises are delivered through the wearable device, either via audio prompts or through a connected mobile application. The LLM continuously monitors the user's adherence to the CBT exercises and adjusts the treatment plan based on real-time data and user engagement. This dynamic adjustment ensures that the therapy remains effective and relevant to the user's current mental health status. Additionally, the wearable device can integrate data from other sources, such as the user's calendar, emails, and messages, to provide a holistic approach to mental health management. For example, it can remind the user to take breaks, suggest relaxation techniques during stressful periods, or recommend physical activities to improve overall well-being. The system can provide continuous, non-invasive health monitoring and personalized health management through the wearable device, leveraging the capabilities of the local LLM to provide intelligent, context-aware health recommendations and interventions.

A wearable device equipped with a local large language model (LLM) can significantly improve health monitoring and management by leveraging advanced sensor technology and AI-driven analysis. This device can capture a wide range of physiological data, including bioimpedance, sweat data, lactic acid levels, EEG (electroencephalogram), ECG (electrocardiogram), blood pressure, and glucose information. By continuously monitoring these health metrics, the device can provide real-time insights into the user's physical and mental health.

The local LLM processes the collected data to identify patterns indicative of various medical conditions, such as hypertension, diabetes, anxiety, and stress. Based on this analysis, the LLM generates personalized cognitive behavioral therapy (CBT) exercises tailored to the user's specific health needs. These exercises are delivered through the wearable device, either via audio prompts or through a connected mobile application, helping the user manage their health proactively.

The LLM also tracks the user's adherence to the recommended CBT exercises and adjusts the treatment plan based on real-time data and user engagement. This dynamic adjustment ensures that the therapy remains effective and relevant to the user's current health status. Additionally, the wearable device can integrate data from other sources, such as the user's calendar, emails, and messages, to provide a holistic approach to health management. For example, it can remind the user to take medication, schedule doctor's appointments, or suggest stress-relief activities during busy periods.

Financial Health

The local LLM can detect financial health by analyzing banking and credit records, identifying patterns and correlations that may indicate a need for improvement. By examining transaction history, account balances, and payment schedules, the app can identify areas where individuals may be overspending or struggling to manage their finances effectively. For instance, if an individual consistently spends more than they earn, or has high levels of outstanding debt, our LLM algorithms can detect these patterns and generate a Cognitive Behavioral Therapy (CBT) program tailored to address specific financial health concerns. The CBT program generated by the LLM would focus on helping individuals develop healthy financial habits, such as creating budgets, prioritizing spending, and managing debt. The program might include personalized exercises and prompts designed to help individuals identify and challenge negative thought patterns related to money management, such as "I'll never be able to pay off my debts" or "I deserve a treat, even if it means going into debt." By reframing these thoughts in more realistic and empowering ways ("I can create a plan to pay off my debts," or "I value myself enough to prioritize saving"), the CBT program would help individuals develop a healthier relationship with money. Additionally, the LLM could provide resources and tools for managing financial stress, such as mindfulness exercises, breathing techniques, and tips for prioritizing self-care. Some potential prompts generated by the LLM might include:

"Reflect on your spending habits: What are some areas where you tend to overspend? How can you adjust your budget to prioritize needs over wants?"

"Challenge negative thoughts about money management: When you think 'I'll never be able to pay off my debts,' what's really going through your mind? Is there a more realistic way of thinking that could help you feel less anxious or stressed?"

"Develop a plan for managing debt: What steps can you take today, this week, and in the next month to start paying down outstanding balances?"

By leveraging LLMs to analyze financial data and generate personalized CBT programs, individuals can gain greater control over their finances, reduce stress and anxiety related to money management, and develop a healthier relationship with money. Here's a more detailed breakdown of each step:

1. 'start_conversation( )': Initialize the conversation by asking the user for permission to access their financial data and providing an overview of how the CBT will help them improve their finances.

2. 'get_financial_data( )':
Ask the user to provide login credentials or authorization tokens to access their credit card, bank statements, and financing statements (e.g., student loans, mortgages).
Use APIs or web scraping techniques to retrieve relevant financial data from these sources.

3. 'analyze_spending_history( )': Analyze the spending history data to identify:
High-interest rate balances that need attention (e.g., credit card debt with high interest rates).
Areas where expenses can be reduced or optimized (e.g., subscription services, dining out).

4. 'identify_areas_for_improvement( )': Based on the analysis, identify areas for improvement in budgeting habits, such as:
Inconsistent spending patterns.
Lack of emergency fund.
High-interest debt that needs to be paid off or consolidated.

5. 'create_budget_plan(user_input)':
Ask the user about their financial goals and priorities (e.g., paying off high-interest debt, building an emergency fund).
Use natural language processing (NLP) techniques to understand the user's input and create a personalized budget plan that aligns with their goals.

6. 'reward_user(milestone_achievement)':
Set milestones for achieving specific financial goals (e.g., paying off 50% of high-interest debt, building an emergency fund).
Provide rewards or incentives when the user achieves these milestones, such as discounts on credit card interest rates or access to exclusive financial resources.

7. 'display_dashboard(improvements_over_time)':
Create a dashboard that displays key metrics and insights about the user's financial progress over time (e.g., debt reduction, savings growth).
Use visualizations like charts, graphs, and tables to help users track their progress and make informed decisions.

8. 'monitor_and_update_financial_data( )':
Continuously monitor the user's financial data to ensure they're on track to meet their goals.
Update the budget plan as needed based on changes in income, expenses, or financial priorities.

9. 'end_conversation( )': End the conversation when the user has achieved their financial goals or decides to stop using the tool.

This pseudocode provides a high-level overview of how a CBT can help users improve their finances by analyzing spending history, identifying areas for improvement, and providing personalized budgeting guidance and rewards.

Third party rewards can be used to create a comprehensive rewards system for a Credit-Based Tool (CBT), for example implementing a program that incentivizes users to achieve their financial goals and maintain good habits. This can be achieved by offering various types of rewards, such as discounts on credit card interest rates or loan payments, exclusive content like expert articles or webinars, cashback rewards from partner businesses, gamification elements like leaderboards, or premium features within the CBT. Milestone-based rewards can offer recognition and incentives when users achieve specific financial milestones, such as paying off all high-interest debt. You can also provide progressive rewards that become increasingly valuable as users continue to make progress towards their goals.

1. Discounts: Offer discounts on credit card interest rates, loan payments, or other fees when users meet certain milestones (e.g., paying off 50% of high-interest debt).

2. Exclusive Content: Provide access to exclusive financial resources, such as expert articles, webinars, or online courses, for achieving specific goals.

3. Cashback and Rewards: Partner with relevant businesses to offer cashback rewards on purchases made through your tool (e.g., 1% cashback on groceries).

4. Gamification: Create a leaderboard that ranks users based on their financial progress, providing bragging rights and motivation to continue improving.

5. Premium Features: Unlock premium features or tools within the CBT for achieving specific milestones (e.g., advanced budgeting templates).

Reward Tiers:

1. Bronze: Achieve basic goals (e.g., create a budget plan) and receive entry-level rewards (e.g., access to exclusive content).

2. Silver: Meet intermediate goals (e.g., pay off 25% of high-interest debt) and unlock mid-tier rewards (e.g., discounts on credit card interest rates).

3. Gold: Achieve advanced goals (e.g., build an emergency fund or pay off all high-interest debt) and receive premium rewards (e.g., cashback rewards).

Reward Mechanics:

1. Milestone-based Rewards: Offer rewards when users achieve specific milestones, such as paying off a certain amount of debt.

2. Progressive Rewards: Provide increasingly valuable rewards for achieving subsequent goals or maintaining good financial habits over time.

3. Tiered Rewards: Unlock new rewards by progressing through tier levels (e.g., Bronze to Silver).

4. Randomized Rewards: Offer surprise rewards or bonuses to keep users engaged and motivated.

With a comprehensive, fair, and transparent rewards system the app can drive adoption, retention, and long-term success for the app and its users.

Long Term Goals

CBT) to help the user reach those goals, we can break down the process into several key steps. This involves understanding user inputs, setting goals, and applying CBT techniques. Here's a detailed explanation:

Identifying Long-Term Goals

User Input and Interaction:

The LLM begins by interacting with the user through a series of questions and conversations. These interactions are designed to gather information about the user's current situation, aspirations, challenges, and preferences.

Example questions might include: "What are your main objectives in the next five years?" or "What challenges are you currently facing that hinder your progress?"

Natural Language Processing (NLP):

The LLM uses advanced NLP techniques to analyze the user's responses. It identifies key themes, recurring topics, and specific phrases that indicate the user's long-term goals.

The model can detect patterns in the user's language that suggest underlying motivations and desires.

Goal Setting:

Based on the analysis, the LLM helps the user articulate clear, specific, and achievable long-term goals. This might involve breaking down broad aspirations into more manageable milestones.

The LLM ensures that the goals are SMART (Specific, Measurable, Achievable, Relevant, Time-bound).

Providing CBT to Reach Long-Term Goals

Cognitive Behavioral Techniques:

The LLM incorporates CBT techniques to help the user address cognitive distortions and develop healthier thinking patterns. This includes identifying negative thoughts, challenging irrational beliefs, and promoting positive behaviors.

Techniques such as cognitive restructuring, behavioral activation, and mindfulness exercises are suggested based on the user's needs.

Personalized CBT Plan:

The LLM creates a personalized CBT plan tailored to the user's goals and challenges. This plan includes specific exercises, journaling prompts, and action steps.

The plan is dynamic and can be adjusted based on the user's progress and feedback.

Regular Check-Ins and Feedback:

The LLM schedules regular check-ins with the user to monitor progress, provide encouragement, and adjust the CBT plan as needed.

During these check-ins, the LLM asks about the user's experiences, successes, and any difficulties encountered. It uses this information to refine the approach and offer additional support.

Skill Development:

The LLM helps the user develop essential skills such as problem-solving, stress management, and emotional regulation. These skills are crucial for overcoming obstacles and staying on track toward long-term goals.

Interactive exercises and real-life scenarios are used to practice and reinforce these skills.

Motivation and Accountability:

The LLM provides motivational support and helps the user stay accountable to their goals. This might include setting reminders, celebrating achievements, and offering words of encouragement.

The LLM can also connect the user with additional resources, such as articles, videos, or support groups, to further support their journey.

Example Scenario

User Interaction:

User: "I want to advance my career and become a senior manager within the next five years, but I often feel overwhelmed and doubt my abilities."

LLM: "Let's break down your goal into smaller steps. What specific skills or experiences do you need to achieve this promotion?"

Goal Setting:

LLM: "Based on our conversation, your long-term goal is to become a senior manager. Let's set some intermediate goals, such as completing a leadership training program, gaining experience in project management, and improving your public speaking skills."

CBT Plan:

LLM: "To help you manage feelings of overwhelm and self-doubt, we'll use cognitive restructuring. When you notice negative thoughts, try to challenge them with evidence and consider alternative perspectives. We'll also practice mindfulness exercises to reduce stress."

Regular Check-Ins:

LLM: "How did your presentation go last week? Did you use any of the techniques we discussed to manage your anxiety?"

Skill Development:

LLM: "Let's work on your problem-solving skills. Here's a scenario: Your team is facing a tight deadline, and there are conflicts about task assignments. How would you approach this situation?"

Motivation and Accountability:

LLM: "Great job on completing the leadership training! Remember to update your resume and LinkedIn profile with your new skills. Keep up the good work!"

By following these steps, the LLM can effectively identify the user's long-term goals and provide tailored CBT support to help the user achieve those goals.

To assist users in automatically handling email, chat, and messaging requests, a mobile device application can employ a local large language model (LLM) to optimize the process. The method involves receiving email, chat, and messaging data from the user's accounts and analyzing this data using natural language processing (NLP) to identify and categorize potential requests. The analyzed data is stored in an encrypted vector database on the device. The LLM detects specific requests that require action, such as scheduling meetings, responding to inquiries, and processing attachments. It then generates suggested responses or actions for these requests and presents them to the user via a mobile application interface.

The identifying and achieving long-term goals using an AI system that incorporates cognitive behavioral therapy (CBT) can include:

A method for identifying and achieving long-term goals using an artificial intelligence system, comprising:

receiving user input through a natural language interface;

analyzing the user input to identify key themes and recurring topics indicative of the user's long-term goals;

generating a set of specific, measurable, achievable, relevant, and time-bound (SMART) goals based on the identified themes;

presenting the generated goals to the user for review and confirmation.

The method of claim 1, further comprising:
creating a personalized cognitive behavioral therapy (CBT) plan tailored to the user's confirmed long-term goals;
incorporating cognitive restructuring techniques to help the user challenge and modify negative thought patterns;
providing behavioral activation exercises to encourage positive actions aligned with the user's goals.
The method can include:
scheduling regular check-ins with the user to monitor progress towards the long-term goals;
collecting feedback from the user during each check-in;
adjusting the CBT plan based on the collected feedback to better support the user's progress.
The method can include:
identifying cognitive distortions in the user's input;
suggesting alternative, more positive perspectives to replace identified cognitive distortions;
tracking the user's acceptance and application of these alternative perspectives over time.
The method can include:
providing interactive exercises to develop essential skills such as problem-solving, stress management, and emotional regulation;
presenting real-life scenarios for the user to practice these skills;
offering feedback and guidance based on the user's performance in the exercises.
The method can include:
generating motivational messages and reminders to encourage the user to stay committed to their long-term goals;
celebrating the user's achievements and milestones reached along the way;
offering words of encouragement and support during challenging times.
The method can include:
connecting the user with additional resources such as articles, videos, or support groups relevant to their long-term goals;
recommending specific resources based on the user's progress and needs;
facilitating access to these resources through the AI system.
The method can include:
utilizing a vector database to store and retrieve semantic information from the user's input and progress data;
employing a retrieval-augmented generation (RAG) system to enhance the AI's responses with context-specific information from the vector database;
ensuring that all data processed by the AI system remains within a secure infrastructure to protect user privacy.
The method can include:
defining key terms and concepts related to the user's long-term goals based on the user's input;
providing clear and concise definitions for these key terms to ensure mutual understanding between the user and the AI system;
updating the definitions as needed based on ongoing user interactions and feedback.
The method can include:
conducting a final review and assessment of the user's progress towards their long-term goals;
generating a comprehensive report summarizing the user's achievements, challenges, and areas for further improvement;
presenting the report to the user along with actionable recommendations for continued progress.

The LLM tracks user engagement with the suggestions and adjusts future recommendations based on this engagement. It can automatically perform predefined actions for specific types of requests, such as sending standard replies or scheduling appointments. The system periodically reassesses the user's communication handling preferences by analyzing new message data and interactions, modifying the handling process over time to improve accuracy and user satisfaction.

Additionally, the LLM prioritizes and categorizes incoming communications based on their content and urgency, drafts responses to routine inquiries, flags important messages for human review, organizes messages into appropriate folders, and generates first drafts of routine documents like reports or memos. It also assists with document preparation by formatting documents according to specified templates, proofreading and suggesting edits for grammar and style, generating presentation slides based on provided content, and creating detailed itineraries.

To detect potential fraud in email, text, and messaging communications, a mobile device app could utilize a local large language model (LLM) to analyze incoming messages. The LLM would process the content using natural language processing techniques to identify suspicious patterns, keywords, or anomalies that may indicate fraudulent activity. Detected indicators could include urgent requests for money or personal information, promises of large sums, pressure tactics, impersonation attempts, or unusual grammar and spelling. If potential fraud is flagged, the app would alert the user and provide an explanation of the concerning elements. With user approval, the app could then generate a set of validation queries to send back to the message sender, such as requests to verify identity, provide documentation, or explain urgency. The LLM would analyze responses to these queries for further inconsistencies or red flags. Based on this additional information, the app would provide an updated fraud risk assessment to the user, highlighting any remaining concerns or confirming legitimacy. This approach allows the local LLM to flag potential scams while empowering the user to engage in further verification, providing an additional layer of protection against sophisticated fraud attempts. approach for fraud detection using an LLM to flag potential fraud from strangers, along with a set of validation queries:

The LLM analyzes incoming emails, texts, and messages from unknown senders to detect potential fraud indicators, such as: Urgent requests for money or personal information, Promises of large sums of money, Requests to click suspicious links, Impersonation of authority figures or organizations, Unusual grammar or spelling errors, and Pressure tactics or threats. If potential fraud is detected, the LLM flags the message and alerts the user, providing an explanation of the suspicious elements. The user can then approve sending a set of validation queries to the sender. These could include:

"Can you please verify your full name and organization?"
"What is the specific reason for your request/offer?"
"How did you obtain my contact information?"
"Can you provide official documentation or credentials to verify your identity?"
"Is there a way I can independently verify this request/offer?"
"Why is this request so urgent? What happens if I need more time to consider?"

"Can you explain in detail how this process/transaction would work?"

"Are there any fees or costs involved that I should be aware of?"

"Who else can I contact to confirm this information?"

"What assurances can you provide that this is legitimate?"

The LLM analyzes the responses to these queries for further fraud indicators or inconsistencies. Based on the responses, the LLM provides an updated fraud risk assessment to the user, highlighting any remaining concerns or confirming legitimacy. The user can then make an informed decision on how to proceed with the communication. The LLM could detect fraudulent emails and provide additional protections:

Domain verification: Compare the sender's email domain against a database of official company domains; Flag emails where the domain doesn't match the purported sender's company; Look for slight misspellings or alterations of legitimate domains (e.g. "amazom.com" instead of "amazon.com")

Direct verification: For suspicious emails, automatically generate a verification email to be sent to the official company domain (e.g. "@company.com"); Ask the company to confirm if the original email and sender are legitimate; Wait for confirmation before allowing any actions on the suspicious email Informing financial institutions: For emails requesting financial transactions, automatically notify the user's bank and/or brokerage; Share details of the suspicious email and requested transaction; Ask the institution to place a temporary hold and verify with the account holder Content analysis: Use natural language processing to detect language patterns common in phishing/scam emails; Look for urgency, threats, unusual requests, grammatical errors, etc.

Metadata examination: Analyze email headers and metadata for signs of spoofing or suspicious routing Link/attachment scanning: Check links and attachments against databases of known malicious content Behavioral analysis: Flag emails that are inconsistent with typical communication patterns from that sender Multi-factor authentication: Require additional verification (e.g. phone call) for high-risk actions like wire transfers User alerts: Notify users of potential fraud attempts and educate using CBT on red flags to watch for.

In a secured computing environment, a method for facilitating secure and personalized communication and task management is provided alongside health monitoring and cognitive behavioral therapy (CBT) intervention. This method ensures all sensitive information remains within the confines of the environment by containing a local large language model (LLM), which is protected by a firewall that precludes any transmission of data to or from external internet sources.

The method relies on the ingestion of predetermined content within this protected environment and utilizes an encrypted vector database to enable retrieval-augmented generation (RAG) for the processing of this data. The system collects user data encompassing a wide spectrum of inputs such as location, health, messaging, email, calendar, and financial data, ensuring each subset of data is securely stored in the encrypted vector database located on the local device.

Leveraging the local LLM, the stored user data is analyzed to predict and anticipate the user's needs and tasks. Engaging RAG mechanisms, the LLM can then generate personalized responses and take initiative on behalf of the user, from sending messages and scheduling appointments to adapting device settings. All actions are executed while prioritizing user privacy, with no transmission of private or confidential information beyond the secured computing environment.

If at any point the local LLM attempts to send packets outside of the secured domain, these packets are intercepted and barred from exit, encouraging the refinement of the local LLM to redirect queries to predetermined internal destinations. Various devices comprise the secured computing environment, including but not limited to mobile devices, wearable devices, vehicles, and Internet of Things (IoT) devices.

Within these environments, the method introduces a novel approach to healthcare by capturing and interpreting health sensor data. The LLM identifies patterns within this health data that could indicate a range of medical conditions, from hypertension and diabetes to anxiety. Based on these findings, the LLM formulates personalized CBT exercises and manages the user's medical condition by adapting CBT treatments in response to tracked adherence and any noted improvements, taking into account the user's behavioral dynamics, coping strategies, impairments, and ongoing functional analysis.

Further refining the method's scope into the realms of mental health and financial management, communication data is scrutinized through natural language processing to detect linguistic patterns that could signify mental health issues, accompanied by the analysis of heart rate data recorded by wearable technology for stress and anxiety markers. Concurrently, financial data is examined to unearth spending behaviors and financial strain, allowing the local LLM to recommend budgets, and strategies to minimize debt costs, and manage investments with associated CBT components tailored to improve financial wellbeing.

The method's utility extends to managing emails, chats, and messages, identifying action-requiring inquiries, scheduling needs, and formulating appropriate responses. The local LLM offers a means to categorize, organize, and prioritize communications while providing directives to optimize daily activities, detect fraud and understand user interests. It also encompasses visual analysis of food consumption to estimate calorific intake used in juxtaposition with other collected health data for nutritional guidance and the generation of CBT exercises.

These systems and processes come together to frame a dynamic, secure, and user-centric computing environment in which the local LLM serves as an intrinsic component in managing a variety of user-specific concerns ranging from daily tasks to health monitoring and personal wellbeing.

The above mobile personal assistant application leverages advanced artificial intelligence and machine learning technologies to offer a wide range of features while prioritizing user privacy and data security. The system utilizes a local large language model (LLM) that operates within a firewall, isolated from the internet, to process and analyze user data securely on the device. The application collects various types of user data, including GPS location, health information from wearable devices, communication data (emails, chats, text messages), financial records, and personal media. This data is stored in an encrypted vector database on the mobile device, using retrieval-augmented generation (RAG) techniques for efficient storage and retrieval.

The LLM serves as a trusted personal assistant, performing tasks such as managing calendars, drafting responses to emails, analyzing financial data, and providing health recommendations. It can also apply cognitive behavioral therapy (CBT) techniques to help users improve their health and financial well-being. The system is designed to anticipate user needs based on calendar events and communication history, and can perform actions on behalf of the user.

Privacy and security are paramount in this application. All data processing occurs locally on the device, and any information sent to the internet is anonymized. If the phone is lost or an unauthorized user attempts to breach the system, it can automatically wipe itself to protect user privacy. The application also implements various security measures, including encryption, secure enclaves, and compliance with data protection regulations.

The system's architecture includes specialized hardware components, such as neural processing units (NPUs) and AI accelerators, optimized for efficient machine learning operations on mobile devices. It employs techniques like model compression, quantization, and sparse computation to enable powerful AI capabilities within the constraints of mobile hardware.

To provide high quality LLM with small footprint, a method is used to update large language models (LLMs) that involves using adversarial question generation techniques to create benchmark tasks that are specifically designed to challenge the known weaknesses in current language models. These benchmark tasks serve as a means for continuous challenge and provide opportunities for improvement. The method includes implementing a real-time feedback loop such that both human experts and users can flag responses provided by the language model for review. This facilitates the immediate identification and correction of errors in the model's outputs.

In order to ensure transparent, auditable, and incentivized data collection to enhance the performance of language models, a blockchain-based system is developed to record the contributions of experts. The blockchain system maintains an immutable ledger that details each contribution and provides a framework for rewarding experts. This system is designed to motivate high-quality input from the experts, which in turn enriches the training and fine-tuning of the language models.

The benchmark tasks devised as part of this method incorporate interdisciplinary challenges that demand the integration of knowledge from multiple domains. It can involve combining mathematical reasoning with ethical decision-making, or scientific knowledge with creative problem-solving. In order to maintain a continuous and tailored level of difficulty, a dynamic difficulty adjustment system is integrated within the benchmark. This system adapts the complexity of tasks in response to the model's performance, constantly adjusting the bar to remain appropriately challenging.

The method is designed to address and quantify social biases. Techniques such as synthetic data generation are employed to simulate diverse demographic scenarios. The model's responses are analyzed for potential biases. Advanced machine learning techniques are applied to detect both subtle and emergent biases. These may not be immediately apparent in individual responses but become evident when analyzing the aggregated data. Conducting longitudinal studies on the model's performance allows the method to track improvements or regressions over time, thereby gaining insights into the long-term effectiveness of different training and fine-tuning strategies.

Another aspect of the method includes creating a collaborative platform for experts. On this platform, they can review, discuss, and refine model responses collectively to ensure a consensus on the accuracy and quality of the knowledge base contributions. Experts are provided with the opportunity to add detailed annotations and context to their answers, enhancing the richness and applicability of training data.

To anticipate potential issues, predictive models are developed to identify possible gaps and weaknesses in LLMs before such deficiencies become evident in output. This proactive strategy enables preemptive data collection and specialized fine-tuning. The benchmark tasks include open-ended tasks requiring long-form text outputs, like creative writing, question-answering, and the specification of tasks. Additionally, the tasks include closed-book question answering to test factual knowledge and reasoning capabilities, mathematical reasoning problems, and coding tasks that involve generating functional computer programs.

Language models are fine-tuned on a subset of these benchmark tasks, and their performance improvements as a result of fine-tuning are evaluated. The analysis of performance includes fitting scaling curves to quantify how performance improvements scale with the increase in model size. Additionally, detecting emergent capabilities that only arise at certain model scales is part of identifying qualitative behaviors. Quantifying social biases involves measuring stereotyping behavior towards different demographic groups in the outputs of the language models. Once identified, biases are mitigated through targeted data filtering or further fine-tuning of the models.

The calibration of the language models is evaluated by comparing their confidence scores to empirical accuracy levels. The models, which usually comprise decoder-only transformer architectures pretrained on web data using self-supervised learning, are further evaluated in a few-shot learning setting by providing them with a small number of examples as context. Their ability to follow complex instructions is also assessed through step-by-step prompts.

Designed to maintain rigorous standards, the benchmark tasks are constructed to be sufficiently difficult such that the best-performing language models achieve less than 50% of the maximum possible score. To facilitate reproducibility and foster competition among different organizations working on LLMs, these benchmarks are released publicly. As language model capabilities advance, new tasks are added to the benchmark to preserve an appropriate level of difficulty. Insights obtained from benchmark evaluations are used to steer future research and development efforts to enhance language model capabilities. The performance of language models is assessed across a broad spectrum of sizes, spanning at least three orders of magnitude in terms of the number of parameters.

The disclosed method extends to addressing knowledge gaps or areas of low performance for the LLMs based on benchmark evaluations by generating questions aimed at these deficiencies. A pool of human experts is engaged to provide answers, which are then incorporated into a knowledge base. The LLMs are fine-tuned or updated using this enriched knowledge base to improve performance on identified knowledge gaps.

Finally, an economic incentive layer is added through blockchain technology. Questions, expert answers, and knowledge base contributions are recorded on a blockchain network, which allows for providing rewards or incentives to experts based on the impact and quality of their contributed answers. This system enables transparent auditing and verification of expert contributions and rewards through blockchain records, thus creating a secure, transparent, and incentivized environment for expert participation in the continuous improvement of language models.

Figure 16:
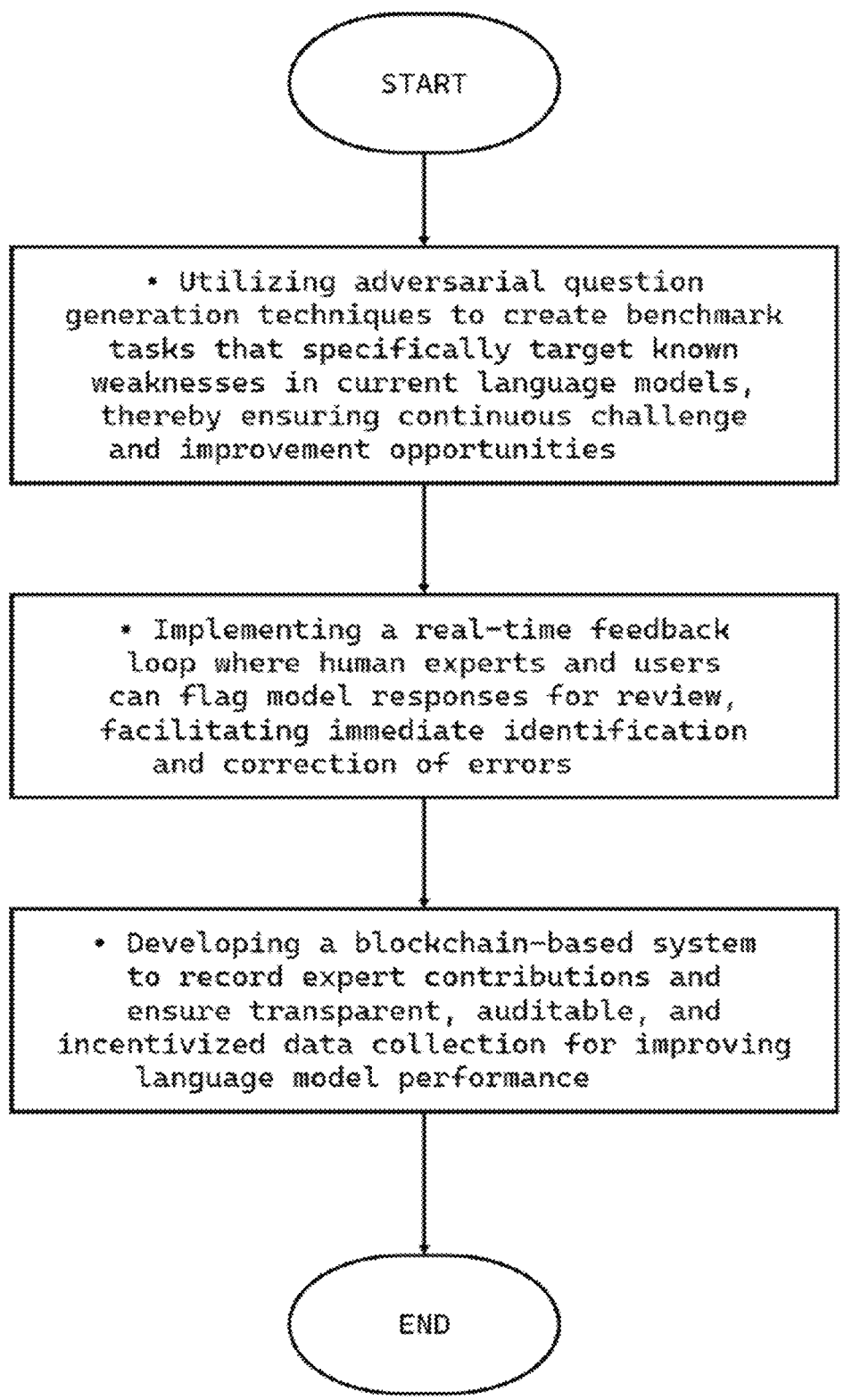

FIG. 16 illustrates a method for continuously evolving and enhancing large language models (LLMs) that leverages adversarial benchmarking, real-time expert feedback, and blockchain technology for transparent and incentivized data collection. Starting at block S101, the method involves utilizing adversarial question generation techniques to create benchmark tasks. These tasks are designed to specifically target known weaknesses in current language models, ensuring constant challenge and opportunities for improvement.

Proceeding to block S102, the method includes implementing a real-time feedback loop. In this loop, human experts and users can flag model responses for review, thereby facilitating the immediate identification and correction of errors. This ensures that issues with the model are addressed promptly, improving the model's accuracy and reliability.

The method continues to block S103, where a blockchain-based system is developed to record expert contributions. This system ensures that the data collection for improving language model performance is transparent, auditable, and incentivized. Blockchain technology provides a secure and immutable record-keeping mechanism that enhances the trustworthiness and integrity of the feedback and contributions made by experts.

This process ensures a systematic approach to keeping LLMs updated and improving by leveraging human expertise and cutting-edge technology, thus culminating in more reliable, unbiased, and capable language models. The method terminates with the end block, indicating the completion of the described process.

Figure 17:
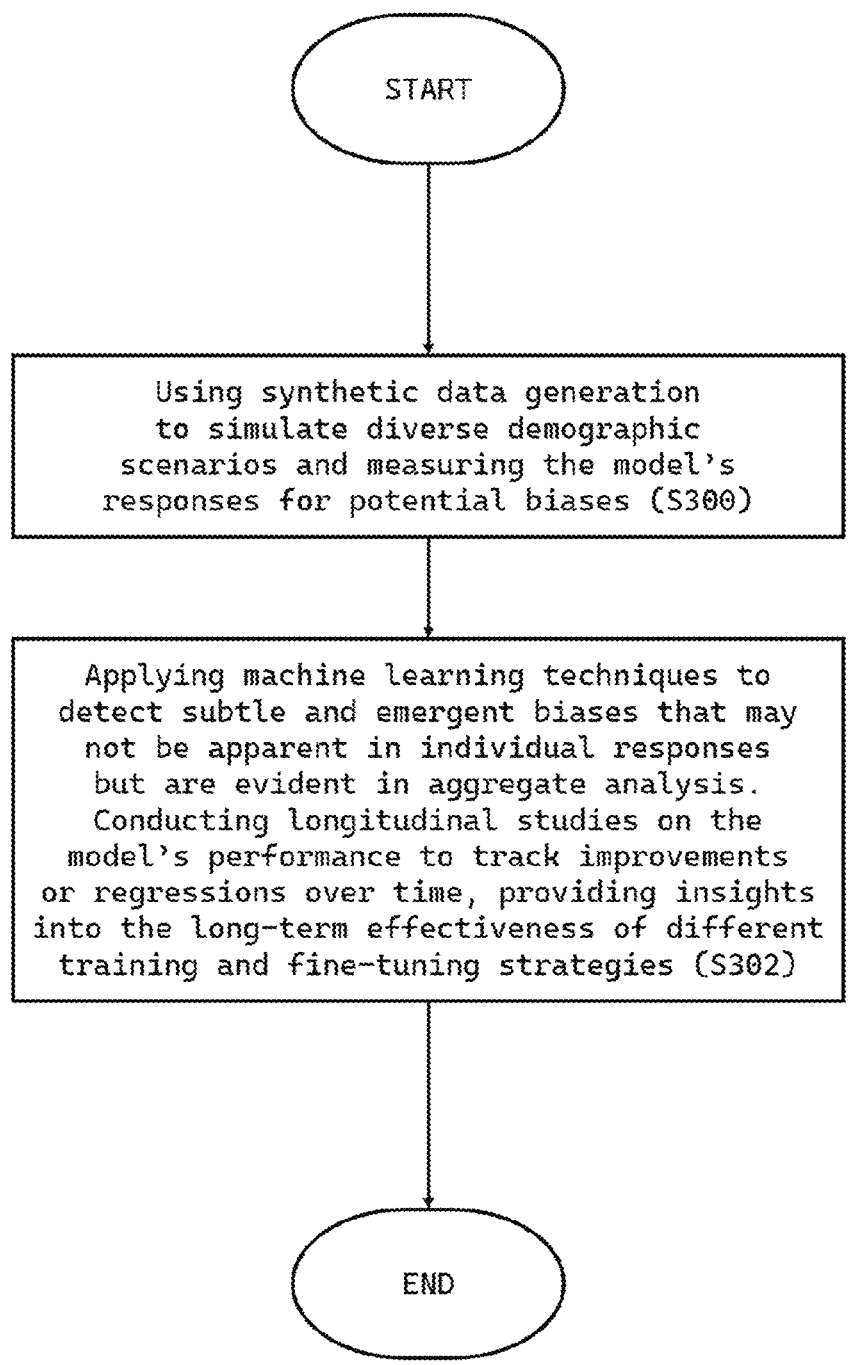

Referring to FIG. 17, the method begins (START) with the generation of synthetic data to simulate a variety of demographic scenarios to measure the model's responses for potential biases (S300). This involves creating diverse synthetic datasets that reflect different demographic situations, allowing for comprehensive analysis of the model's fairness and bias across different groups.

Subsequently, machine learning techniques are applied to detect both subtle and emergent biases. These biases may not be readily apparent in individual model responses but can become evident through aggregate analysis (S302). This step involves advanced analytical methods to spot nuanced biases that might affect the model's overall performance.

Further, longitudinal studies are conducted to track the model's performance over time. These studies assess improvements or regressions, providing valuable insights into the long-term effectiveness of various training and fine-tuning strategies (S302). They ensure that any bias reduction or performance enhancement observed is sustained over longer periods, rather than being short-lived.

The process concludes with an ongoing evaluation and adjustment cycle to ensure the model maintains and continues to improve in fairness, reliability, and effectiveness through continuous benchmarking and iterative improvements guided by both synthetic data and empirical analysis.

Figure 18:
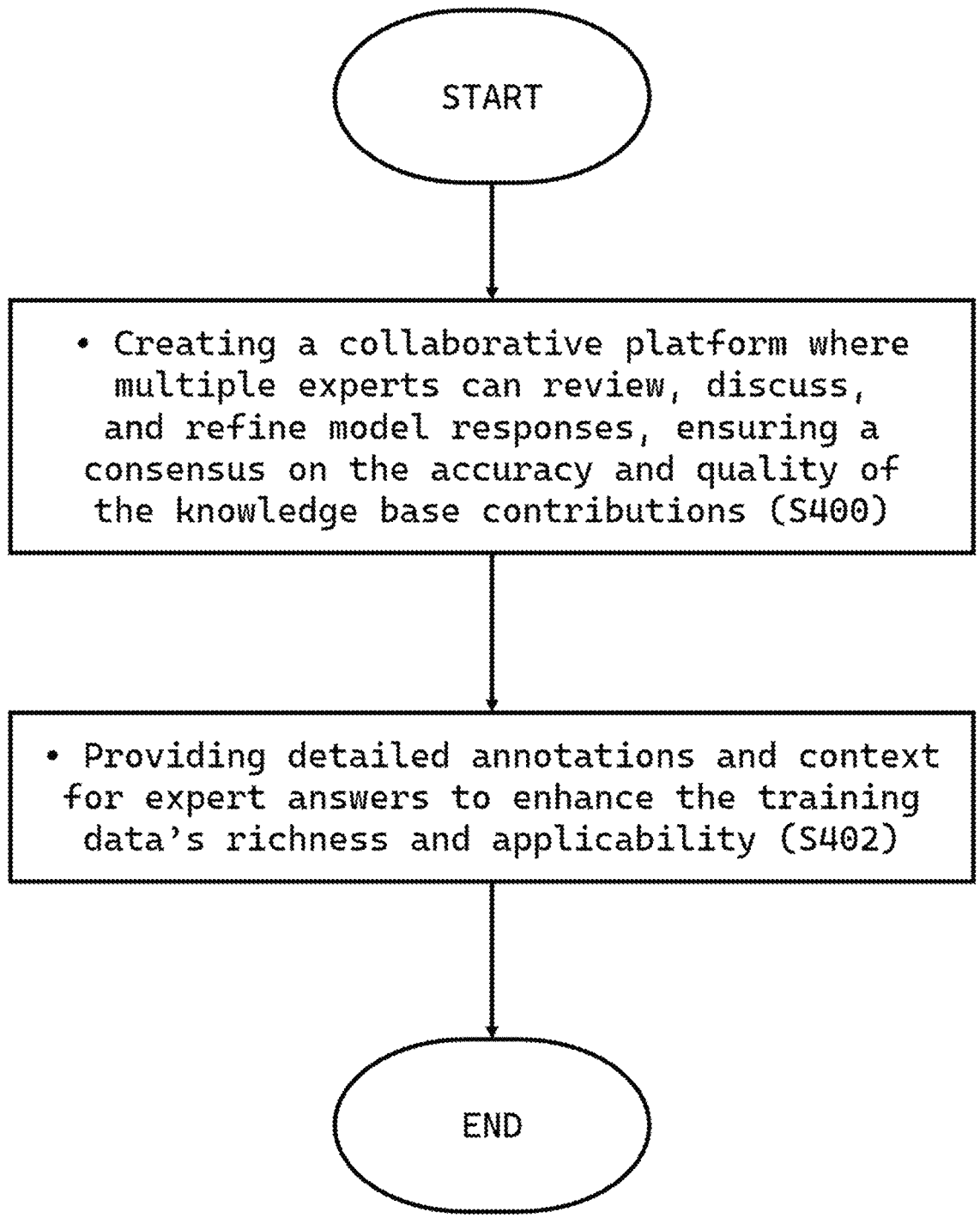

FIG. 18 illustrates a process flow designed to enhance the quality and accuracy of contributions made to a knowledge base used for improving large language models (LLMs). The process begins at the "START" point. The first step (S400) involves creating a collaborative platform where multiple experts can review, discuss, and refine model responses. This platform ensures that there is a consensus on the accuracy and quality of the knowledge base contributions, thus fostering the reliability of the data being incorporated into the LLMs.

Following this, the next step (S402) emphasizes providing detailed annotations and context for expert answers. This step is crucial as it enhances the richness and applicability of the training data, making the models more adept at understanding nuanced information and context. The process concludes, marked by the "END" point, ensuring that all stages of expert review and annotation are meticulously handled to support continuous improvement of the language models.

Figure 19:
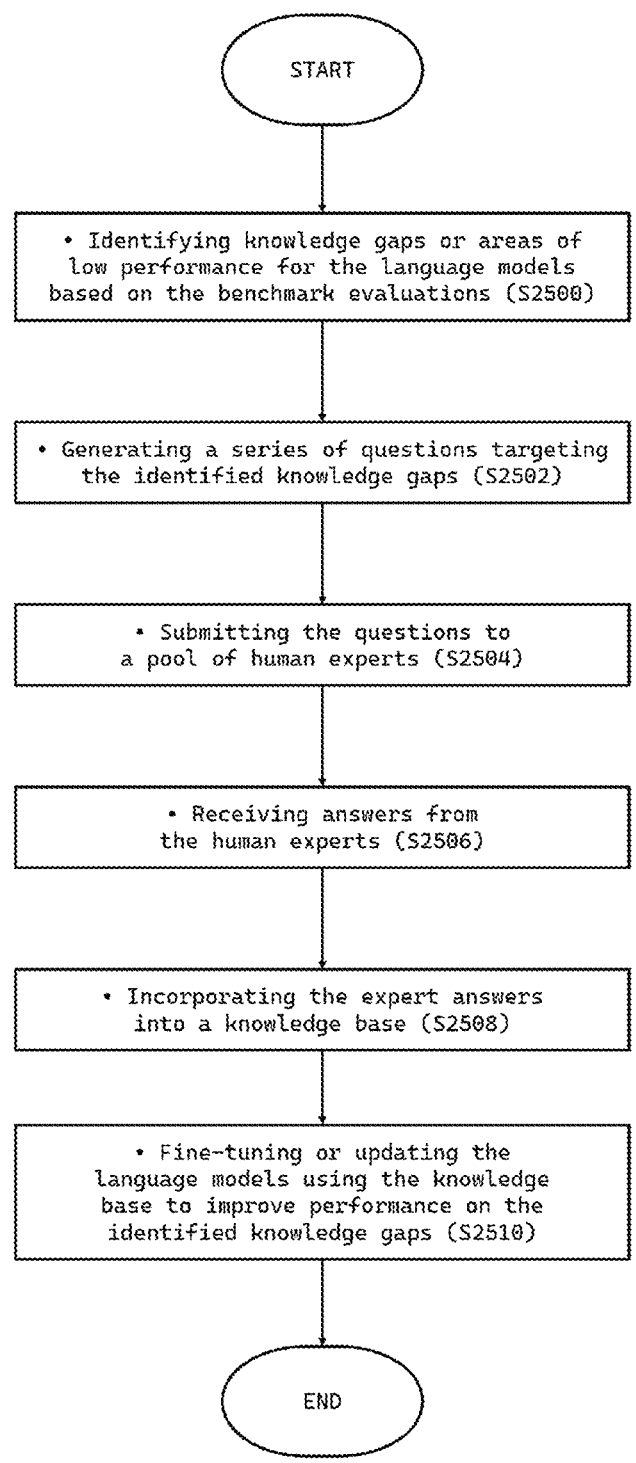
Figure 20:
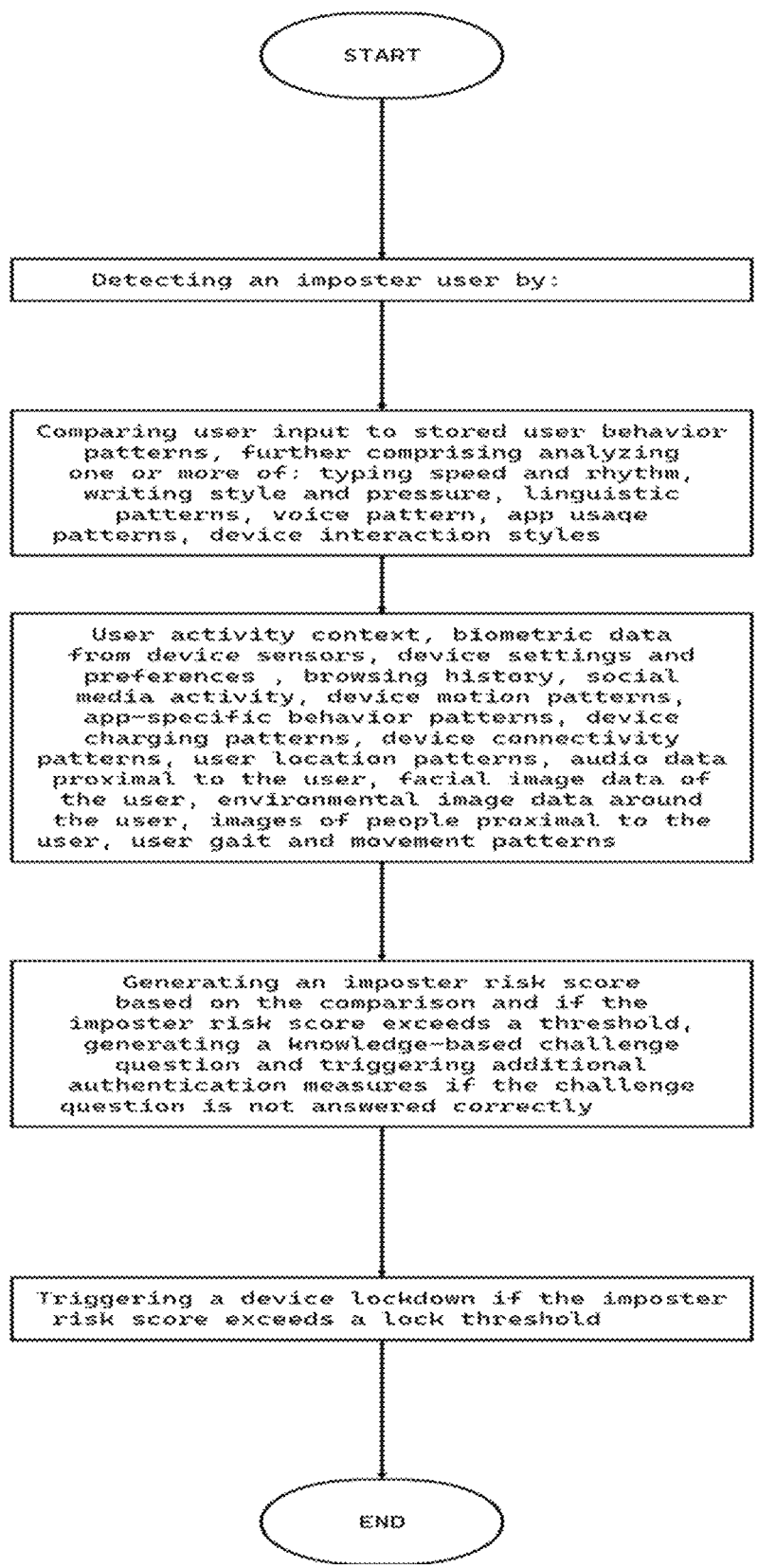

Referring to FIG. 19, the method begins with the identification of knowledge gaps or areas where the language models demonstrate low performance, which is based on the results of benchmark evaluations (S2500). Following this, a series of questions specifically targeting the identified knowledge gaps is generated (S2502). These questions are then submitted to a pool of human experts for assessment (S2504). The system subsequently receives the answers provided by the human experts (S2506) and incorporates these expert-provided answers into a comprehensive knowledge base (S2508). Finally, the language models are fine-tuned or updated utilizing the knowledge base to enhance performance on the previously identified knowledge gaps (S2510). This cycle ensures continuous improvement and adaptation of the language models.

To provide high quality LLM for personal assistance on the mobile device, one embodiment refines the local LLM by periodically evaluating the capabilities of the local LLM:
  a. providing a benchmark comprising a plurality of tasks that probe different capabilities of language models, wherein the tasks have predetermined difficulty and beyond the full capabilities of current language models;
  b. evaluating the performance of a plurality of language models of varying sizes on the benchmark tasks by:
  c. Providing text inputs for the benchmark tasks to the language models;
  d. Receiving text outputs from the language models in response to the text inputs;
  e. Scoring the text outputs against target outputs or metrics defined for each benchmark task;
  f. Analyzing how the performance of the language models changes as a function of the size of the language models to characterize current capabilities and limitations of the language models;
  g. Identifying qualitative behaviors that emerge in the language models at certain scales, including sudden breakthroughs in performance on particular types of tasks;
  h. Quantifying social biases present in the language model outputs and how the biases change with increasing model scale and different prompting contexts;
  i. Wherein the benchmark is designed to remain difficult for language models to fully solve even as they are scaled up, thereby enabling measurement of long-term progress in language model capabilities.

Implementations can include one or more of the following. The benchmark tasks comprise open-ended tasks that require generating long-form text outputs. The open-ended tasks include creative writing, question-answering, and task specification. The benchmark tasks comprise closed-book question answering tasks that test factual knowledge and reasoning capabilities. The benchmark tasks comprise mathematical reasoning tasks that require deriving solutions to math problems. The benchmark tasks comprise coding tasks that involve generating functional computer programs. The system performs fine-tuning the language models on a subset of the benchmark tasks and evaluating performance improvements from fine-tuning. The system performs fitting scaling curves to quantify how performance scales with increasing model size. The identifying qualitative behaviors comprises detecting emergent capabilities that arise abruptly at certain model scales. The quantifying social biases comprises measuring stereotyping behavior towards different demographic groups in the language model outputs. The mitigating identified social biases through targeted data filtering or model fine-tuning. The evaluating the calibration of the language models by comparing their confidence scores to empirical accuracy levels. The decoder-only transformer architectures can be pretrained on web data using self-supervised learning. The evaluating the performance of the language models in a few-shot learning setting by providing a small number of examples as context. The evaluating the ability of the language models to follow complex instructions by providing step-by-step prompts. The benchmark tasks are designed to be sufficiently difficult that the best performing language models achieve less than 50% of the maximum possible score. The method includes Identifying knowledge gaps or areas of low performance for the language models based on the benchmark evaluations; Generating a series of questions targeting the identified knowledge gaps; Submitting the questions to a pool of human experts; Receiving answers from the human experts; Incorporating the expert answers into a knowledge base; Fine-tuning or updating the language models using the knowledge base to improve performance on the identified knowledge gaps. The method can include Recording the questions, expert answers, and knowledge base contributions on a blockchain network; Providing rewards or incentives to the human experts on the blockchain network based on the quality and impact of their contributed answers; Enabling transparent auditing and verification of the expert contributions and rewards through the blockchain records. The user can elect to sell the encoded expertise to other LLM operators/users.

As the local LLM contains information that can be misused if the mobile device is compromised by an imposter, the local LLM can be remotely disabled by the true owner. If the owner is somehow unavailable to stop the local LLM, the local LLM has built in protection against imposter control. The LLM can employ several strategies to identify an imposter user attempting to access the mobile device or its data:

Behavioral analysis: The LLM can analyze user behavior patterns, such as typing speed, app usage habits, and interaction styles. Any significant deviations from the established patterns could indicate an imposter.

Language processing: By analyzing the linguistic patterns, vocabulary, and writing style of user inputs, the LLM can detect inconsistencies that may suggest an imposter. This includes examining factors like sentence structure, word choice, and even common grammatical errors unique to the authorized user.

Contextual awareness: The LLM can leverage its understanding of the user's typical activities, schedules, and preferences to identify suspicious requests or actions that don't align with the user's normal behavior.

Multi-factor authentication: The LLM can prompt for additional verification methods if it detects potential imposter activity, such as requesting biometric data or answers to personal security questions.

Anomaly detection: By continuously monitoring device usage patterns, the LLM can flag unusual activities, such as accessing rarely used apps or attempting to change security settings.

Knowledge-based challenges: The LLM can generate personalized questions based on the user's history and stored information, which an imposter would likely struggle to answer correctly.

Temporal and location-based analysis: Unusual login times or locations that don't match the user's typical patterns could trigger additional scrutiny from the LLM.

Voice recognition: If the device has voice interaction capabilities, the LLM can analyze voice patterns to detect potential imposters.

Interaction with secure enclaves: The LLM can work in conjunction with the device's secure enclave to verify the authenticity of biometric data and other secure credentials.

Continuous authentication: Rather than relying on a single point of authentication, the LLM can continuously monitor and verify the user's identity throughout the session.

If the LLM detects a potential imposter, it can take protective actions such as limiting access to sensitive data, requiring additional authentication, or even locking down the device to prevent unauthorized use. The key is to balance security with user convenience, using the LLM's contextual understanding to make intelligent decisions about when to challenge the user's identity.

In one aspect, a method for detecting an imposter on a mobile device includes: receiving user input data; analyzing the user input data using a local large language model (LLM); comparing the analyzed input data to stored user behavior patterns; generating an imposter risk score based on the comparison; and triggering additional authentication measures if the imposter risk score exceeds a predetermined threshold. For example, the imposter user by: comparing user input to stored user behavior patterns, further comprising analyzing one or more of: typing speed and rhythm, writing style and pressure, linguistic patterns, voice pattern, app usage patterns, device interaction styles; user activity context, biometric data from device sensors, device settings and preferences, browsing history, social media activity, device motion patterns, app-specific behavior patterns, device charging patterns, device connectivity patterns, user location patterns, audio data proximal to the user, facial image data of the user, environmental image data around the user, images of people proximal to the user, user gait and movement patterns; generating an imposter risk score based on the comparison and if the imposter risk score exceeds a threshold, generating a knowledge-based challenge question and triggering additional authentication measures if the challenge question is not answered correctly; and triggering a device lockdown if the imposter risk score exceeds a lock threshold.

Using a local large language model (LLM) on a mobile device for non-password access authentication to computer services and devices offers several advantages in terms of security, convenience, and efficiency. The LLM can analyze a variety of user data, such as behavioral patterns, biometric data, and contextual information, to authenticate the user without the need for traditional passwords. Thus, similar to a bank teller, if the LLM recognizes the bank manager, vault access can be provided without further passwords.

Behavioral Analysis: The LLM can monitor and analyze user behavior patterns, such as typing speed, rhythm, and pressure, as well as app usage patterns and device interaction styles. By comparing these patterns to stored user behavior data, the LLM can generate an imposter risk score. If the score exceeds a certain threshold, additional authentication measures can be triggered.

Biometric Data: The LLM can utilize biometric data from device sensors, such as facial recognition, voice patterns, and fingerprint data, to authenticate the user. This data is processed locally, ensuring that sensitive information is not transmitted to external servers, thereby enhancing privacy and security.

Contextual Information: The LLM can analyze contextual information, such as location data, calendar events, and communication patterns, to verify the user's identity. For example, if the user typically accesses a service from a specific location or during certain times, deviations from these patterns can trigger additional authentication steps.

Multi-Factor Authentication: The LLM can implement multi-factor authentication by combining behavioral analysis, biometric data, and contextual information. This layered approach enhances security by making it more difficult for imposters to gain access.

Continuous Authentication: Instead of relying on a single point of authentication, the LLM can continuously monitor and verify the user's identity throughout the session. This reduces the risk of unauthorized access if the device is left unattended or stolen.

Adaptive Learning: The LLM can adapt to changes in the user's behavior and environment over time. By continuously learning from new data, the LLM can maintain high accuracy in authentication, even as the user's habits evolve.

Privacy and Security: All data processing occurs locally on the device, ensuring that sensitive information is not exposed to external threats. The use of an encrypted vector database further enhances data security.

User Convenience: Non-password authentication methods, such as biometric and behavioral analysis, provide a seamless and convenient user experience. Users do not need to remember complex passwords or undergo frequent password resets.

Fraud Detection: The LLM can detect potential fraud by analyzing communication content and comparing sender domains against a database of official company domains. It can also generate validation queries to verify the sender's identity and assess the risk of fraud based on the responses.

Integration with Other Services: The LLM can integrate with various services and applications on the mobile device, such as email, chat, and messaging platforms, to provide a unified authentication solution. This integration allows for a more comprehensive analysis of user behavior and context.

In summary, using a local LLM for non-password access authentication on mobile devices enhances security, privacy, and user convenience. By leveraging advanced AI techniques to analyze behavioral, biometric, and contextual data, the LLM provides a robust and adaptive authentication solution that can protect against unauthorized access and fraud.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for a secured computing environment, comprising:
providing a local large language model (LLM) secured by a firewall that restricts the LLM to data only within the secured computing environment without sending information to the Internet;
specifying predetermined content and applying an encrypted vector database to the predetermined content for use in retrieval-augmented generation (RAG);
collecting user data from sensors and applications and storing the collected user data in an encrypted vector database;
analyzing the stored user data using the local LLM to anticipate user tasks; and
applying RAG with the local LLM to generate a personalized response or to perform actions on behalf of a user, wherein the local LLM maintains user privacy by processing data locally in the secured environment without transmitting private or confidential information to a processor outside of the secured computing environment.

2. The method of claim 1, comprising blocking a packet sent by the local LLM destined outside of the secured computing environment, and retraining or refining the local LLM to redirect outside access to a predetermined destination inside the secured computing environment.

3. The method of claim 1, wherein the secured computing environment comprises a mobile device, a wearable device, a vehicle, or an Internet of Things (IoT) device.

4. The method of claim 1, wherein collecting user data comprises collecting one or more of location data, health data, messaging data, email data, calendar data, and financial data and wherein performing actions comprises one or more of: sending messages, scheduling appointments, and adjusting device settings.

5. The method of claim 1, wherein generating personalized recommendations comprises
applying cognitive behavioral therapy techniques to the analyzed user data; and
generating recommendations to improve user productivity, health, or finances.

6. The method of claim 1, comprising:
receiving health sensor data, including heart rate data, blood pressure data;
analyzing health sensor data using a local large language model (LLM) to identify patterns indicative of user medical conditions, including hypertension, diabetes, or anxiety;
detecting the user medical condition based on health sensor data;
generating personalized CBT exercises based on the detected medical condition using the local LLM;
presenting the personalized CBT exercises to the user via a mobile device application;
tracking user adherence to the CBT exercises and adjusting the CBT exercises based on the tracked adherence using the local LLM;
detecting improvements in the user's medical condition based on subsequent health sensor data and modifying the applied CBT treatment based on the detected improvements using the local LLM;
identifying behavioral excesses and deficits related to the detected medical condition using the local LLM and generating interventions targeted at modifying the identified behavioral excesses and deficits;
assessing the user's coping behaviors related to the detected medical condition using the local LLM and incorporating coping skill development into the applied CBT treatment;
evaluating impairments in the user's functioning due to the detected medical condition using the local LLM and prioritizing treatment of impairments;
conducting an ongoing functional analysis using the local LLM to identify antecedents and consequences maintaining problematic behaviors related to the medical condition; and
periodically reassessing the user's medical condition and treatment progress using the local LLM and adjusting the CBT exercises based on the reassessment.

7. The method of claim 1, comprising:
receiving text, email, and chat communications data from a user's mobile device;
analyzing the communications data using natural language processing to detect linguistic patterns indicative of mental health issues;
receiving heart rate data from a wearable heart rate monitor worn by the user;
analyzing the heart rate data to identify patterns associated with anxiety, stress, or other mental health conditions;
detecting a potential mental health issue based on the analysis of the communications data and heart rate data;
generating personalized CBT exercises tailored to the detected mental health issue using the local LLM on the mobile device;
presenting the personalized CBT exercises to the user;
tracking user engagement with the CBT exercises and adjusting the exercises based on the tracked engagement using the local LLM;
periodically reassessing user mental health condition by analyzing new communications and heart rate data; and
modifying the CBT treatment plan based on the reassessment using the local LLM.

8. The method of claim 1, comprising:
receiving financial data from one or more financial sources, including Quicken, bank records, credit card records, charges from online companies, mortgage interest rates, and spending habits;
analyzing the financial data using the local LLM to identify patterns indicative of financial problems, high-interest rate balances, spending patterns, emergency funds, and outstanding debt;
applying the local LLM to create budgets, prioritize spending to minimize debt costs, and manage investments and savings;
generating personalized CBT exercises to improve financial health; and
tracking user engagement with the CBT exercises and adjusting the exercises based on the tracked engagement using the local LLM.

9. The method of claim 1, comprising assisting a user to automatically handle email, chat, and messaging requests by, comprising:
receiving email, chat, and messaging data;
analyzing the received data using the local LLM to identify requests that require action, including scheduling meetings and responding to inquiries;
generating suggested responses or actions using the local LLM and presenting the suggested responses for user approval; and
tracking user engagement with the suggestions and retraining the local LLM based on user engagement to improve future recommendations.

10. The method of claim 1, comprising:
receiving GPS location data, calendar events, health data, email data, chat data, and messaging data;
analyzing the received data with the local LLM to identify patterns and contextual information relevant to user daily activities;
generating a contextual suggestion for optimizing daily activities based on the analysis, wherein the suggestion includes one or more of the following:
prioritizing and categorizing incoming emails, chat messages, and text messages based on their content and urgency;
drafting responses to routine inquiries using the local LLM;
flagging selected messages for human review;
organizing emails, chat messages, and text messages into folders based on content and context;
providing travel tips and recommendations based on traffic conditions, including suggesting alternative routes to avoid congestion;
recommending nearby restaurants or coffee shops based on user location and meeting schedules;
offering proactive reminders about upcoming tasks and appointments by analyzing calendar events and deadlines;
suggesting adjustments to a daily schedule to optimize time usage including scheduled meetings or drive times based on traffic conditions; and
preparing and formatting documents according to specified templates, proofreading and suggesting edits for grammar and style, generating presentation slides based on provided content, and creating detailed itineraries.

11. The method of claim 1, comprising:
analyzing by the local LLM a communication content and detecting one or more indicators of fraud;
comparing a sender domain against a database of official company domains to identify mismatches or slight misspellings indicative of fraud;
verifying a sender authority by abstracting the communication content to preserve privacy and sending a verification email from the local LLM to one or more official company domains;
generating with the local LLM a set of validation queries to the sender based on the communication content, including requests to verify identity, provide documentation, and details supporting the request;
analyzing responses to the validation queries by the local LLM for inconsistencies; and
updating a fraud risk assessment based on the responses to the validation queries.

12. The method of claim 1, comprising
collecting email, chat, and message communications data;
analyzing the communications data using natural language processing to create question-and-answer pairs;
applying data augmentation to the question-answer pairs to increase diversity of the data; and
using the question-and-answer pairs from communications data and user interactions to fine-tune the local LLM.

13. The method of claim 1, comprising:
generating a set of targeted questions based on the analysis of the communications data, designed to fill knowledge gaps in the local LLM;
receiving and storing answers to the generated targeted questions in the encrypted vector database;
applying data augmentation to question-answer pairs to increase the diversity of the data; and
using the question-and-answer pairs from communications and direct user interactions to fine-tune the local LLM.

14. The method of claim 1, comprising:
receiving user input specifying negotiation objectives and criteria;
analyzing the user input using the local LLM to identify negotiation parameters and priorities;
analyzing a proposal or agreement from a counterparty using the local LLM to identify terms, conditions, and clauses relevant to the user's negotiation objectives;
comparing the identified terms, conditions, and clauses against the negotiation parameters and priorities;
generating a redlined version showing favorable terms, unfavorable terms and neutral terms;
providing explanations for each redlined item, detailing why it is favorable or unfavorable based on the user's objectives and criteria;
generating counterproposals for unfavorable terms using the local LLM, taking into account industry standards and best practices;
receiving user feedback on the counterproposals; and
revising the proposal or agreement based on user feedback using the local LLM.

15. The method of claim 1, comprising:
analyzing communication data and search data to identify user interests and preferences;
generating a list of activities tailored to the user interests and preferences with the local LLM based on user location, calendared travel plan, and location of contacts in a user network; and
automatically booking one or more activities upon user approval.

16. The method of claim 1, comprising:

receiving image data of food items consumed by a user;

analyzing the image data using a visual large language model to identify food items and estimate calorie content;

collecting health data including heart rate, accelerometer data, sleep duration and quality data from sensors on a mobile device or a wearable device;

analyzing the collected health data and estimated calorie intake using the local LLM to determine net calorie based on the estimated calorie intake and calorie burn from activities, and using the net calorie to generate personalized health recommendations; and generating cognitive behavioral therapy (CBT) exercises based on the personalized health recommendations.

17. The method of claim 1, comprising detecting an imposter user by:

comparing user input to stored user behavior patterns, further comprising analyzing one or more of: typing speed and rhythm, writing style and pressure, linguistic patterns, voice pattern, app usage patterns, device interaction styles; user activity context, biometric data from device sensors, device settings and preferences, browsing history, social media activity, device motion patterns, app-specific behavior patterns, device charging patterns, device connectivity patterns, user location patterns, audio data proximal to the user, facial image data of the user, environmental image data around the user, images of people proximal to the user, user gait and movement patterns;

generating an imposter risk score and if the imposter risk score exceeds a threshold, generating a knowledge-based challenge question and triggering additional authentication measures if the challenge question is not answered correctly; and triggering a device lockdown if the imposter risk score exceeds a lock threshold.

18. The method of claim 1, wherein the local LLM is trained or refined from email, chat or messaging conversations and additionally from question and answer sessions with a subject and evaluating a model quality with a set diverse questions and utilizing a third party LLM to judge model outputs by combining outputs from the models into a single prompt for each question and assessing the output by the third party LLM.

19. A method for a secured computing environment, comprising:

providing a local large language model (LLM) secured by a firewall that restricts the LLM to data only within the secured computing environment without sending information to the Internet;

refining or training the local LLM from email, chat or messaging conversations and additionally from question-and-answer sessions with a subject and evaluating a model quality with a set diverse questions and utilizing a third party LLM to judge model outputs by combining outputs from the models into a single prompt for each question and assessing the output by the third party LLM;

collecting user data from sensors and applications and storing the collected user data in an encrypted vector database; and applying retrieval-augmented generation (RAG) with the local LLM to generate a personalized response or to perform actions on behalf of a subject.

20. A method for a secured computing environment, comprising:

providing a visual large language model (LLM);

collecting user data from sensors and applications and storing the collected user data in an encrypted vector database coupled to the LLM;

comparing user data to stored user behavior patterns, further comprising analyzing with a local LLM a typing speed and rhythm, writing style and pressure, linguistic pattern, voice pattern, app usage patterns device interaction; user activity context, biometric data from device sensor, device settings and preferences, browsing history, social media activity, device motion pattern, app-specific behavior pattern, device charging pattern, device connectivity pattern, user location pattern, audio data proximal to the user, user face image, images of people proximal to the user and user environment, user gait and movement patterns; and triggering a device lockdown or denying access to a computing service if an imposter user is detected.

* * * * *